United States Patent
Merkel

(10) Patent No.: US 6,377,729 B2
(45) Date of Patent: Apr. 23, 2002

(54) OPTICAL DEVICE WITH NEGATIVE THERMAL EXPANSION SUBSTRATE AND USES THEREFOR

(75) Inventor: Gregory A. Merkel, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/747,561

(22) Filed: Dec. 22, 2000

Related U.S. Application Data

(62) Division of application No. 09/305,763, filed on May 5, 1999, now Pat. No. 6,187,700.
(60) Provisional application No. 60/086,053, filed on May 19, 1998.

(51) Int. Cl.[7] .............................. G02B 6/00; G02B 6/34
(52) U.S. Cl. ........................ 385/37; 385/129; 385/141; 385/144
(58) Field of Search .................... 385/37, 10, 141–145, 385/129–132, 43; 501/32, 102, 103, 105, 126, 127, 152, 153

(56) References Cited

U.S. PATENT DOCUMENTS

| | | |
|---|---|---|
| 4,801,566 A | 1/1989 | Limaye et al. |
| 5,322,559 A | 6/1994 | Sleight et al. |
| 5,433,778 A | 7/1995 | Sleight |
| 5,514,360 A | 5/1996 | Sleight et al. |
| 5,694,503 A | 12/1997 | Fleming et al. |
| 5,919,720 A | 7/1999 | Sleight et al. |
| 5,926,599 A * | 7/1999 | Bookbinder et al. ........ 385/137 |
| 6,081,641 A * | 6/2000 | Chen ............................ 385/43 |

OTHER PUBLICATIONS

Yamai et al., Grain Size–Microcracking Relation for $NaZr_2(PO_4)_3$ Family Ceramics, J. Am. Ceram. Soc.76[2] 487–91 (1993).

Martinek et al., Linear Thermal Expansion of Three Tungstates, Journal of The American Ceramic Society—Discussion and Notes, Apr. 1968, vol. 51, No. 4, pp. 227–228.

Graham et al., A New Ternary Oxide, $ZrW_2O_8$, Journal of the American Ceramic Society—Discussion and Notes, vol. 42, No. 11.

Martinek et al., Subsolidus Equilibria in the System $ZrO_2$–$WO_3$–$P_2O_5$, Journal of the American Ceramic Society—Martinek and Hummel, vol. 53, No. 3pp.159–161.

Evans et al., Letter to the Editor Negative Thermal Expansion in a Large Molybdate and Tungstate Family, Journal of Solid State Chemistry, 133, 580–583 (1997), Article No. SC977605.

Tsvigunov et al., Preparation of $Zr_2WO_4(PO_4)_2$ and indexing of its X-ray diffraction pattern, Russian Journal of Inorganic Chemistry 35 (12) 1990, p. 1740.

Evans et al., Structure of $Zr_2(WO_4)(PO_4)_2$ from Powder X-Ray Data: Cation Ordering with No Superstructure, Journal of Solid State Chemistry 120, 101–104 (1995).

* cited by examiner

Primary Examiner—Hemang Sanghavi
(74) Attorney, Agent, or Firm—Svetlana Short

(57) ABSTRACT

Negative thermal expansion materials, methods of preparation and uses therefor are disclosed. The materials are useful for negative thermal expansion substrates, such as those used for optical fiber gratings.

13 Claims, 6 Drawing Sheets

OPTICAL DEVICE WITH NEGATIVE THERMAL EXPANSION SUBSTRATE AND USES THEREFOR

This application claims priority to divisional U.S. application Ser. No. 09/305,763, filed on May 5, 1999, now U.S. Pat. No. 6,187,700, which claims priority to Provisional U.S. Application No. 60/086,053, filed on May 19, 1998, the contents of which are herein incorporated by reference.

FIELD OF THE INVENTION

The invention pertains to negative thermal expansion materials, devices made therefrom, and methods of making the materials. More particularly, the present invention concerns compositions including zirconium phosphate tungstates, which can be used to make substrates for athermalized optical fiber reflective grating devices.

BACKGROUND OF THE INVENTION

Negative thermal expansion (contraction with increasing temperature) is an unusual and potentially useful property for a solid material, and very few crystalline materials possess strongly negative expansions over an extended temperature range. Materials that exhibit a negative expansion due to extensive microcracking, by virtue of a negative coefficient of thermal expansion ("CTE") along at least one crystallographic axis and a substantially different CTE along at least one other axis, include some lithium aluminosilicates, "NZPs" (compounds with crystal structures similar to that of $NaZr_2P_3O_{12}$), and $Ta_2O_5$-$WO_3$ compounds. On the other hand, materials having negative mean lattice expansions that do not require microcracking for negative bulk ceramic CTEs are even more limited, and include certain synthetic alkali-free zeolites having low aluminum contents, $ZrW_2O_8$, $HfW_2O_8$, $ZrV_{2-x}P_xO_7$ (above about 100° C.), and $NbZrP_3O_{12}$ (an NZP type compound).

Of the compounds that have negative mean lattice expansions, zeolite expansions from 25 to 100° C. are in the range $-20 \times 10^{-7}$ °C.$^{-1}$ to $-40 \times 10^{-7}$ °C.$^{-1}$, but have the disadvantages of being dependent upon the amount of adsorbed water in the zeolite, and their CTE curves can exhibit considerable hysteresis. The CTE of $NbZrP_3O_{12}$ below 100° C. is about $-27 \times 10^{-7}$ °C.$^{-1}$, while that of $ZrW_2O_8$ and $HfW_2O_8$ is about $-90 \times 10^{-7}$ °C.$^{-1}$. Thus, $ZrW_2O_8$ and $HfW_2O_8$ are presently unique as materials that display a CTE more negative than $-40 \times 10^{-7}$ °C.$^{-1}$ without microcracking.

Martinek and Hummel (1960, *J. Amer. Ceram. Soc.*, 53, 159–161) first reported the existence of $Zr_2P_2WO_{12}$ in their study of the phase relations in the $ZrO_2$-$WO_3$-$P_2O_5$ system at 1125° C. An XRD powder pattern was presented for this new compound, which reportedly has a melting point above 1750° C., although extensive volatilization occurs in air at 1600° C. Synthesis of $Zr_2P_2WO_{12}$ was achieved by calcining a mixture of hydrous zirconium carbonate, tungstic acid, and mono-hydrogen ammonium phosphate.

Tsvigunov and Sirotinkin (1990, *Russ. Jour. of Inorg. Chem.*, 35, 1740) subsequently reported a more complete and precise powder XRD pattern for this compound, which they synthesized from a mixture of $ZrO_2$, $WO_3$, and $NH_4H_2PO_4$. Evans et al. (1995, *Jour. Solid State Chem.*, 120, 101–104) have shown that the structure of $Zr_2P_2WO_{12}$ (also referred to as $Zr_2(WO_4)(PO_4)_2$) is comprised of $ZrO_6$ octahedra sharing corners with $WO_4$ and $PO_4$ tetrahedra. Those workers report that dilatometric and variable temperature X-ray diffractometry studies indicate that $Zr_2P_2WO_{12}$ exhibits a negative thermal expansion over a broad temperature range. More recently, Evans et al. (1997, *Journal Solid State Chem.*, 133, 580–83) have reported that $Zr_2P_2WO_{12}$ has a mean lattice CTE of about $-30 \times 10^{-7}$ °C.$^{-1}$.

The $Zr_2P_2WO_{12}$ bodies synthesized according to the methods reported in the above literature have porosities greater than about 25%, typically greater than 30%. Such high porosity bodies generally are not useful for industrial applications. Thus, it would be useful to provide a composition having a low, preferably a negative thermal expansion, comprised of $Zr_2P_2WO_{12}$, or analogues thereof in which Hf is fully or partially substituted for Zr, having a porosity less than about 20%, preferably less than about 10%, and more preferably less than about 5%.

Bodies having a highly negative CTE, such as $-30$ to $-100 \times 10^{-7}$ °C.$^{-1}$, can find use as substrates for athermalization of fiber Bragg gratings (FBGs). In the latter application, a FBG is mounted in tension on the negative expansion substrate. Applications of FBGs include passive wavelength division multiplexing and filtering in dense WDM systems, as well as distributed fiber sensors for smart systems to monitor bridges, structures, and highways.

For such applications, variation of the center wavelength of fiber Bragg gratings (FBGs) with respect to temperature, due to thermal expansion of the fiber and variation of the refractive index of the glass, must be minimized. For example, at a Bragg wavelength of 1550 nm, thermal variation of $\lambda_B$ is expected to be 0.012 nm/° C., whereas a value less than 0.002 nm/° C. is desired. Variation in $\lambda_B$ with temperature can be reduced to well below 0.002 nm/° C. by mounting the FBG in tension on a substrate having a negative thermal expansion of about $-70$ to $-85 \times 10^{-7}$ °C.$^{-1}$ within that range also $-70$ to $-80 \times 10^{-7}$ °C.$^{-1}$, $-75$ to $-82 \times 10^{-7}$ °C.$^{-1}$. The reduction in tension with increasing temperature associated with the contraction of the substrate partially or entirely offsets the contribution to increased optical path length resulting from the thermal expansion and change in refractive index of the glass.

β-eucryptite based ceramics formed by controlled devitrification of sintered lithium aluminosilicate glass are being studied as FBG substrates and are disclosed in international patent application no. PCT/US/13062, Beall et al., entitled, "Athermal Optical Device." The attainment of CTEs of $-70$ to $-85 \times 10^{-7}$ °C.$^{-1}$ in β-eucryptite bodies requires extensive microcracking; an unmicrocracked β-eucryptite exhibits a CTE near $-5 \times 10^{-7}$ °C.$^{-1}$. This microcracking results from internal stresses associated with the large difference in CTE along the c and a axes of the crystals (approximately $-176$ and $+78 \times 10^{-7}$ °C.$^{-1}$, respectively), coupled with the coarse grain size of the crystals.

U.S. Pat. No. 5,694,503, issued to Fleming et al., discloses using the negative coefficient of thermal expansion material $ZrW_2O_8$ to form substrates for temperature compensated fiber Bragg gratings. Since the coefficient of thermal expansion of $ZrW_2O_8$ may be too negative to provide temperature compensation for Bragg gratings, the Fleming et al. patent suggests mixing $ZrW_2O_8$ with a positive coefficient of thermal expansion material such as alumina, silica, zirconia, magnesia, calcia, or yttria in an amount to raise the coefficient of thermal expansion.

The mixtures of $ZrW_2O_8$ with positive coefficient of thermal expansion materials suggested in the Fleming et al. patent, however, have several disadvantages. Large relative differences in the thermal expansion coefficients of $ZrW_2O_8$ and the positive CTE materials can cause microcracking in the composite material upon heating and cooling of the material. Such microcracking can result in hysteresis in the thermal expansion curve or dimensional change of the body with changes in humidity, characteristics that are undesirable in a fiber Bragg grating substrate. Furthermore, many of the positive CTE components recommended in the Fleming et al. patent react with the $ZrW_2O_8$ during sintering to form copious amounts of liquid. Such reactions and liquid formation tend to cause the body to slump during firing. Alternatively, some of the positive CTE components recommended in the Fleming et al. patent react with the $ZrW_2O_8$ to form other high CTE crystalline phases so that the ceramic body does not have the desired strongly negative CTE after firing. In addition, ceramics comprised of $ZrW_2O_8$ and $ZrO_2$ undergo a length change having an absolute value greater than 500 parts per million over 700 hours at 85% relative humidity and 85° C., which is undesirably large.

The presence of microcracking in a FBG substrate requires that the fiber/substrate package be hermetically sealed to prevent dimensional drift of the substrate due to opening and closing of the microcracks resulting from variations in humidity. Hermetic sealing adds significantly to the cost of the assembly, and the reliability of the device becomes dependent upon long-term reliability of the hermetic seal.

Thus, it would be desirable to provide an unmicrocracked material having a porosity less than about 25%, preferably less than about 10% and more preferably less than about 5%. Further, there is a need for a body having a CTE of about $-70 \times 10^{-7}$° $C.^{-1}$ to $-85 \times 10^{-7}$° $C.^{-1}$ to provide temperature compensation for the gratings of current interest which could be used to make FBG substrates because hermetic sealing would not be required for long-term stability. In addition, it would be desirable to provide a material that has a length change having an absolute value less than 500 ppm over 700 hours at 85° C. and 85% relative humidity.

SUMMARY OF INVENTION

The present invention provides a low-porosity body containing at least one phase having a negative thermal expansion, a method of making the phase, and devices made from the phase. In one embodiment, the body is comprised of the compound $Zr_2P_2WO_{12}$ which exhibits a room-temperature CTE of about $-40 \times 10^{-7}$° $C.^{-1}$, and a CTE from about 25 to 800° C. of about $-25 \times 10^{-7}$° $C.^{-1}$. Hafnium may be partially or entirely substituted for zirconium. The body further comprises a crystalline or non-crystalline oxide phase, which may include a glassy phase, which contains a metal selected from the group consisting of alkaline earth metals, alkali metals, manganese, iron, cobalt, copper, zinc, aluminum, gallium, and bismuth. The oxide phase may also contain one or more of the metals selected from the group zirconium, tungsten and phosphorous.

In another embodiment, this invention comprises a ceramic body comprised of two negative CTE phases, preferably wherein at least one of the phases has a room temperature CTE more negative than $-50 \times 10^{-7} C^{-1}$. In an exemplary embodiment, one phase has the composition $M_2B_3O_{12}$ where M is selected from the group including aluminum, scandium, indium, yttrium, the lanthanide metals, zirconium, and hafnium, and where B is selected from the group consisting of tungsten, molybdenum, and phosphorus, and where M and B are selected such that the compound $M_2B_3O_{12}$ has a negative CTE, and comprising a second phase of the composition $AX_2O_8$, where A is selected from the group consisting of zirconium and hafnium, and X is selected from the group consisting of tungsten and molybdenum.

For example, the ceramic body may comprise a mixture of $ZrW_2O_8$ and $Zr_2P_2WO_{12}$, wherein hafnium may be partially or fully substituted for zirconium in $Zr_2P_2WO_{12}$ and $ZrW_2O_8$. In a preferred embodiment, the ceramic body is unmicrocracked. The ceramic body may further include a crystalline or non-crystalline oxide phase, which may include a glassy phase, which contains a metal selected from the group consisting of alkaline earth metals, alkali metals, lanthanum group metals, niobium, titanium, manganese, iron, cobalt, nickel, copper, zinc, yttrium, scandium, aluminum, gallium, and bismuth. The oxide phase may also contain one or more of the metals selected from the group zirconium, tungsten and phosphorous.

The invention also includes a method of making ceramic bodies of the present invention comprising mixing together powders of $Zr_2P_2WO_{12}$ or precursor powders of $Zr_2P_2WO_{12}$ or analogues of these powders in which Hf is substituted for Zr, or mixtures thereof, and at least one oxide or oxide precursor of metals selected from the group consisting of alkaline earth metals, alkali metals, manganese, iron, cobalt, copper, zinc, aluminum, gallium, and bismuth.

Another embodiment of this invention involves a method of raising and making the negative thermal expansion of a ceramic body less negative comprising a phase having a room temperature coefficient of thermal expansion more negative than $50 \times 10^{-7}$° $C.^{-1}$ comprising mixing together the first phase with at least a second phase or precursors of the first phase and at least the second phase, the second phase having a negative thermal expansion less negative than $-50 \times 10^{-7}$° $C.^{-1}$. A body made according to this method preferably will not exhibit microcracking. Alternatively, the method includes forming a ceramic body comprising two negative CTE phases, preferably wherein the room temperature CTE of one of the phases is more negative than $-50 \times 10^{-7} C^{-1}$ and the other phase is less negative than $-50 \times 10^{-7} C^{-1}$, to provide a body having a CTE less negative than $-50 \times 10^{-7} C^{-1}$.

In an exemplary embodiment, one phase has the composition $M_2B_3O_{12}$ where M is selected from the group including aluminum, scandium, indium, yttrium, the lanthanide metals, zirconium, and hafnium, and where B is selected from the group consisting of tungsten, molybdenum, and phosphorus, and where M and B are selected such that the compound $M_2B_3O_{12}$ has a negative CTE, and comprising a second phase of the composition $AX_2O_8$, where A is selected from the group consisting of zirconium and hafnium, and X is selected from the group consisting of tungsten and molybdenum. In another exemplary embodiment, the method comprises mixing $ZrW_2O_8$ or precursors of $ZrW_2O_8$, or analogues of these materials in which Hf is substituted for Zr, with $Zr_2P_2WO_{12}$ or precursor powders of $Zr_2P_2WO_{12}$ or analogues of these powders in which Hf is substituted for Zr. Optionally, these may also be mixed with at least one oxide or oxide precursor of metals selected from the group consisting of alkaline earth metals, alkali metals, manganese, iron, cobalt, copper, zinc, aluminum, gallium, and bismuth. The mixed powders are consolidated together using a ceramic forming method and heated to sinter the ceramic body. Preferably, the heating occurs at a temperature of about 1050° C. to 1300° C., more preferably 1120° C. to 1230° C. for about 1 minute to 10 hours. When the $ZrW_2O_8$ phase is desired to be present in the ceramic body, preferably heating occurs at a temperature of about 1150° C. to 1230° C.

Another aspect of the invention involves an optical device comprising a negative expansion substrate having a composition comprising two negative CTE phases, preferably wherein at least one of the phases has a room temperature CTE more negative than $-50 \times 10^{-7}$ °C.$^{-1}$, and one of the phases has a thermal expansion less negative than $-50 \times 10^{-7}$ °C.$^{-1}$. For example, the substrate composition may comprise a mixture of $ZrW_2O_8$ and $Zr_2P_2WO_{12}$. Hafnium may be partially or fully substituted for zirconium in $Zr_2P_2WO_{12}$ and $ZrW_2O_8$. In a preferred embodiment, the substrate is unmicrocracked. The substrate may further include a crystalline or non-crystalline oxide phase, which may include a glassy phase, which contains a metal selected from the group consisting of alkaline earth metals, alkali metals, lanthanum group metals, niobium, titanium, manganese, iron, cobalt, nickel, copper, zinc, yttrium, scandium, aluminum, gallium, and bismuth. The oxide phase may also contain one or more of the metals selected from the group zirconium, tungsten and phosphorous.

The device further comprises a thermally sensitive, positive expansion optical component affixed to the substrate. In one embodiment, the optical component is an optical fiber grating and the substrate has a mean linear coefficient of thermal expansion of about $-40 \times 10^{-7}$ °C.$^{-1}$ to $-85 \times 10^{-7}$ °C.$^{-1}$ over a temperature range of about $-40$° C. to 85° C. Another aspect of the invention relates to a negative expansion substrate having a composition comprising $Zr_2P_2WO_{12}$ and a crystalline or non-crystalline oxide phase, which may include a glassy phase, which contains a metal selected from the group consisting of alkaline earth metals, alkali metals, manganese, iron, cobalt, copper, zinc, aluminum, gallium, and bismuth. Hafnium may be fully or partially substituted for zirconium. The oxide phase may also contain one or more of the metals selected from the group zirconium, tungsten and phosphorous.

Thus the present invention generally provides a novel ceramic body comprised of phase having a negative CTE, such as $Zr_2P_2WO_{12}$ or $Hf_2P_2WO_{12}$ or mixtures thereof, which exhibits a negative coefficient of thermal expansion (CTE) at all temperatures from at least as low as 25° C. to at least as high as 500° C. The mean CTE near room temperature is about $-40 \times 10^{-7}$ °C.$^{-1}$, while the mean CTE from 25 to 800° C. is about $-25 \times 10^{-7}$ °C.$^{-1}$. The $Zr_2P_2WO_{12}$ or $Hf_2P_2WO_{12}$ phase is stable at all temperatures from at least as low as $-50$° C. to at least as high as 1150° C.

Also disclosed is a method for fabricating the sintered ceramic body which, in some embodiments, entails the addition of small amounts of additives which function as sintering aids to powders of $Zr_2P_2WO_{12}$ or $Hf_2P_2WO_{12}$ or mixtures thereof or their precursors. These additives include the compounds of lithium, sodium, potassium, magnesium, calcium, barium, manganese, iron, copper, and zinc. Aluminum compounds may also be used as sintering aids, but are not as effective. Compounds of rubidium, cesium, and strontium would also likely be effective for densification.

The present invention also includes a ceramic body comprised mainly of the phases $ZrW_2O_8$ and $Zr_2P_2WO_{12}$ and their hafnium analogues and mixtures thereof, having a mean linear coefficient of thermal expansion of about $-40$ to $-85 \times 10^{-7}$ °C.$^{-1}$ over the temperature range $-40$° C. to $+85$° C. These bodies also exhibit a negative CTE to higher temperatures as well. Preferred embodiments of the invention have less than 10% total porosity, especially less than 5% porosity. In one embodiment, achievement of low porosity is enhanced by the addition of small amounts (0.01 to 5.0 wt %) of certain sintering additives, such as the oxides or oxide-forming compounds of alkali (group IA) metals, alkaline earth (group IIA) metals, manganese, iron, cobalt, nickel, copper, zinc, yttrium, scandium, lanthanide metals, niobium, titanium, aluminum, gallium, and bismuth. Many of these materials have the desirable properties of having excellent dimensional stability at 85° C. and 85% relative humidity and possessing no microcracking, and thus exhibit no hysteresis in their thermal expansion curves. Such ceramics are suitable as athermalizing substrates for fiber Bragg gratings.

Additional features and advantages of the invention will be set forth in the description which follows. It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention. In the drawings, like reference characters denote similar elements throughout the several views. It is to be understood that various elements of the drawings are not intended to be drawn to scale, but instead are sometimes purposely distorted for the purposes of illustrating the invention.

DETAILED DESCRIPTION

Figure 1:
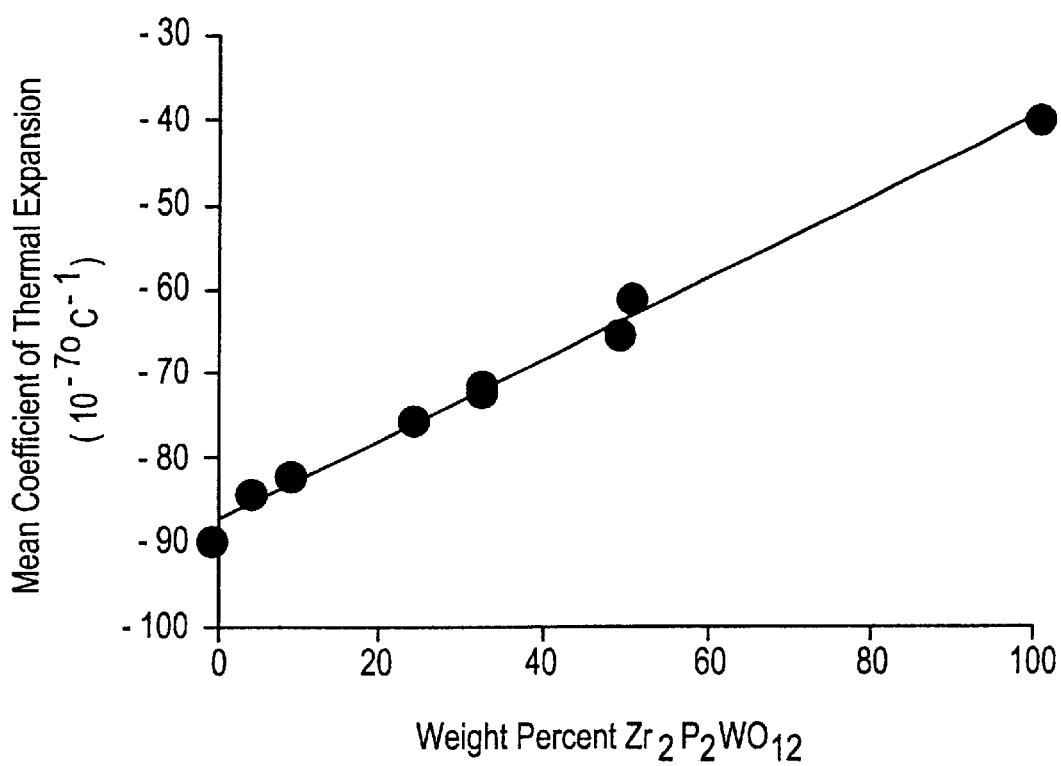
FIG. 1 shows the relationship of the dependence of the coefficient of thermal expansion at 25° C. on the weight percent of $Zr_2P_2WO_{12}$ in a ceramic body comprised mainly of $Zr_2P_2WO_{12}$ and $ZrW_2O_8$.

Reference will now be made in detail to the present preferred embodiment of the invention, an example of which is illustrated in the accompanying drawings.

According to one embodiment of the present invention, small amounts of additives, which function as sintering aids, are mixed with $Zr_2P_2WO_{12}$ powder or to a mixture of precursor compounds that can form $Zr_2P_2WO_{12}$ by reaction. The precursors may include, for example, $ZrO_2$, $Zr(NO_3)_4.xH_2O$, $ZrOCl_2.xH_2O$, $Zr(SO_4)_2.xH_2O$, $WO_3$, $H_2WO_4.xH_2O$, $P_2O_5$, $ZrP_2O_7$, $Zr_2P_2O_9$, $Zr(HPO_4)_2.xH_2O$, $ZrW_2O_8$, $NH_4H_2PO_4$, $(NH_4)_2HPO_4$, $(NH_4)_3PO_4.3H_2O$, phospho-tungstic acid, etc. Hafnium may be partially or fully substituted for zirconium. The mixtures may be dry mixed or blended using an appropriate organic or inorganic liquid medium. Water may be used when the precursors have low aqueous solubility. If mixed in a fluid medium, the precursors may also be milled by any of the methods known to the art (e.g., ball milling, attrition milling, vibratory milling, etc.). When some or all of the precursors are soluble in water, they may be dissolved in water and subsequently coprecipitated to form an even more intimate mixture.

The mixture may optionally be dried and calcined, followed by milling, or may be directly "green" formed into the desired shape. Organic binders such as a polyethylene glycol or methyl cellulose may optionally be added to provide strength to the green body. The body is then raised to and held at a temperature sufficient for densification to take place, such as at 1150° C. for 4 hours.

In another aspect of the invention, ceramic bodies are comprised predominately of two materials having a negative CTE, such as $ZrW_2O_8$ and $Zr_2P_2WO_{12}$ or their hafnium analogues or mixtures thereof, and the bodies exhibit CTEs of −40 to −85×10$^{-7}$° C.$^{-1}$ between −40° C. and +85° C. In one embodiment one of the materials has a room temperature CTE more negative than about −50×10$^{-7}$° C.$^{-1}$. Depending upon the ratio of the two negative CTE materials, it is possible to achieve these CTEs in the body without microcracking. Ceramic bodies having negative CTEs within this range without relying upon microcracking have not previously been reported in the literature, and represent a unique invention.

In a two-phase ceramic containing $ZrW_2O_8$, the second phase must either be in chemical equilibrium with $ZrW_2O_8$ at the sintering temperature, or else reaction between the second phase and $ZrW_2O_8$ must be sufficiently slow that most of the second phase is retained through the firing process. Also, to avoid microcracking, the difference between the CTEs of the two phases, $\Delta$CTE, must be minimized (while still being sufficient to achieve the desired bulk CTE of about −70×10$^{-7}$° C.$^{-1}$ to −85×10$^{-7}$° C.$^{-1}$), and the mean grain size of the components must be finer than some critical value which is dictated by the value of $\Delta$CTE. The term "grain size" is meant to include either the size of a primary crystal, or the size of a cluster or aggregate of two or more adjacent crystals of the same phase.

Addition of chemically compatible phases with positive CTEs, such as $ZrSiO_4$, $ZrO_2$, or $WO_3$, to a $ZrW_2O_8$-based ceramic could be employed to create materials having expansions less negative than that of pure $ZrW_2O_8$, however, the large disparity in CTE between the two components would result in microcracking unless the grains of the two phases were maintained at less than about 1 micron during sintering.

The present invention involves the discovery of an alternative to prevent microcracking. Applicant has discovered that the combination of a material having a strongly negative CTE, for example, a first material such as $ZrW_2O_8$ having a room temperature CTE more negative than −50×10$^{-7}$° C.$^{-1}$, with a second phase whose CTE is also negative, but not as strongly negative as that of the first material, results in lower stresses from the CTE mismatch between the phases. Thus, the present invention provides a body that avoids microcracking for grain sizes less than about 15 microns, preferably less than about 10 microns. In an additional alternative embodiment, the grain sizes are greater than 1 micron.

Applicant has recently measured the room temperature CTE of the compound $Zr_2P_2WO_{12}$ to be about −40×10$^{-7}$° C.$^{-1}$. Applicant has discovered that because the CTE of this compound is not extremely different from that of $ZrW_2O_8$, a ceramic body containing both phases can exhibit a CTE of intermediate value without undergoing microcracking, provided that the grain size of the two components is less than about 10 microns. This restriction on grain size can easily be met for an appropriate choice of starting materials and sintering conditions.

According to an exemplary embodiment of the present invention, powders of $ZrW_2O_8$ and $Zr_2P_2WO_{12}$, or precursors that form $ZrW_2O_8$ and $Zr_2P_2WO_{12}$ by reaction upon firing, or their hafnium analogues or mixtures thereof, are mixed together and formed into the desired shape by ceramic processes known in the art, e.g., dry pressing, injection molding, extrusion, slip casting, etc. Mixing may be performed on the dry powders, or the powders may be mixed with a liquid and may optionally be further reduced in particle size by ball milling, attrition milling, vibratory milling, etc. An organic binder may be added to the powders to increase handling strength in the green (pre-fired) state. Optionally, inorganic or organometallic compounds which serve as densification aids may also be added in small quantities to the mixture of starting materials. It has been found that oxides or oxide-forming compounds of alkali (group IA) metals, alkaline earth (group IIA) metals, manganese, iron, cobalt, nickel, copper, zinc, yttrium, scandium, lanthanide metals, niobium, titanium, aluminum, gallium, and bismuth are especially effective at reducing porosity of the ceramic body during firing. The quantity of sintering aids is preferably the minimum amount required for densification, as it has been found that larger additions of such additives tend to produce large-scale cracking of the body during firing.

The body may be placed upon a glass or ceramic setter pallet or in a partially enclosed container of a glass or ceramic material and heated to a maximum temperature of between about 1120 and 1230° C., preferably between about 1150 to 1200° C., and held for a period of time sufficient for reaction and sintering to take place, such as 1 minute to 10 hours. A glass or ceramic powder or "sand" may be placed between the body and the pallet to reduce drag during shrinkage of the body during firing. Zirconium oxide or zircon powder or silica powder or sand are especially preferred in this role. After holding at peak temperature, the body is rapidly cooled to a temperature below about 500° C. in a few minutes to minimize decomposition of the $ZrW_2O_8$ phase. $ZrW_2O_8$ is unstable below about 1140° C., but decomposition proceeds only very slowly at temperatures less than about 800° C. The fired body may optionally undergo surface grinding or other machining if desired.

The present invention is illustrated by the following non-limiting examples.

EXAMPLES 1 to 18

Examples 1–18 were prepared by mixing together powders of zirconium oxide, tungsten oxide, and acid zirconium phosphate, $Zr(HPO_4)_2 \cdot 0.93H_2O$, in the proportions required to yield the compound $Zr_2P_2WO_{12}$ after firing. Mixtures for Examples 2–18 also contained 1 weight percent addition of a metal oxide, or metal oxide forming source. Powders were mixed with a sufficient amount of isopropanol to form a slurry, and the slurry was milled in a vibratory mill for approximately sixteen hours using zirconium oxide milling media. The slurry was subsequently dried in a dish at about 85° C., repulverized, and the powder pressed into 1.2 cm diameter, 0.4 cm thick pills, or 7.6 cm×1.3 cm×0.4 cm bars in a steel mold at a pressure of about 70 Mpa (10,000 pounds/inch$^2$). The pills and bars were placed on coarse zirconium oxide sand in covered aluminum oxide setter boxes inside of an electrically heated furnace. Temperature of the furnace was raised at a rate of about 30° C./hr to 350° C. to allow volatilization of the water from the acid zirconium phosphate, then heated at a rate of about 100 to 200° C./hr to a maximum temperature of 1150° C. After holding at 1150° C. for 4 hours, power to the furnace was shut off and the samples gradually cooled to room temperature.

The fired bars were cut to a 5 cm length for measurement of thermal expansion. Porosity was measured by the Archimedes method, and phases present after firing were determined by powder x-ray diffractometry (XRD). Coefficients of thermal expansion were measured by dilatometry.

Example 1 shows that, in the absence of a sintering additive, the $Zr_2P_2WO_{12}$ ceramic was poorly densified, containing about 32 percent porosity. The mean coefficient of thermal expansion (CTE) from 25 to 50° C. was $-32\times10^{-7}$ °C.$^{-1}$, and from 25 to 500° C. was $-30\times10^{-7}$ °C.$^{-1}$. This specimen consisted entirely of the desired $Zr_2P_2WO_{12}$ phase.

Examples 2–4 demonstrate that the addition of only 1% of the carbonates of the alkali (Group IA) metals is highly effective in promoting densification of the $Zr_2P_2WO_{12}$ ceramics. Samples contain essentially no open porosity, and total porosities are reduced to approximately 1–5%. Thermal expansions remain strongly negative at room temperature. XRD showed that these ceramic bodies contain mostly $Zr_2P_2WO_{12}$ with minor amounts of $LiZr_2P_3O_{12}$, $NaZr_2P_3O_{12}$, and $KZr_2P_3O_{12}$, in samples 2 4, respectively. These secondary phases are responsible for the somewhat less negative CTE from 25 to 500° C. for Examples 2 and 3.

Examples 5–7 illustrate that the addition of only 1% of the oxides or carbonates of the alkaline earth (Group IIA) metals is also very effective in reducing the porosity of $Zr_2P_2WO_{12}$ ceramics. Total porosities are less than 3%, and there is virtually no open porosity. Fired bodies contained predominately $Zr_2P_2WO_{12}$. Example 5 contained a very minor amount of $MgWO_4$, Example 6 contained very minor amounts of $CaZr_4P_6O_{24}$ and $CaWO_4$, and Example 7 had a very small amount of $BaZr_4P_6O_{24}$. CTEs were very negative from 25 to 50° C. ($-27$ to $-35\times10^{-7}$ °C.$^{-1}$) and 25 to 500° C. ($-24$ to $-26\times10^{-7}$ °C.$^{-1}$).

TABLE 1

Experimental data for $Zr_2P_2WO_{12}$ ceramics.

| | | | | Measured on pills | | | Measured on bars | | | Mean Coefficient of Thermal Expansion ($10^{-7}$ °C.$^{-1}$) | | |
| --- | --- | --- | --- | --- | --- | --- | --- | --- | --- | --- | --- | --- |
| | Weight | | | Bulk | | | Bulk | | | | | |
| Example Number | % $Zr_2P_2WO_{12}$ | Weight % Additive | Additive | Density (g/cm³) | % Open Porosity | % Total Porosity | Density (g/cm³) | % Open Porosity | % Total Porosity | $-40$ to $+85°$ C. | 25 to 50° C. | 25 to 500° C. |
| 1 | 100 | 0 | none | 2.71 | 28.5 | 30.5 | 2.65 | 31.1 | 32.1 | | $-32$ | $-30$ |
| 2 | 99 | 1 | $Li_2CO_3$ | 3.85 | 0.1 | 1.3 | 3.87 | 0.3 | 0.8 | | $-25$ | $-15$ |
| 3 | 99 | 1 | $Na_2CO_3$ | 3.81 | 0.0 | 2.3 | 3.84 | 0.1 | 1.5 | | $-27$ | $-18$ |
| 4 | 99 | 1 | $K_2CO_3$ | 3.69 | 0.4 | 5.4 | 3.70 | 0.5 | 5.1 | $-39$ | $-35$ | $-27$ |
| 5 | 99 | 1 | MgO | 3.87 | 0.0 | 0.8 | 3.87 | 0.1 | 0.8 | | $-35$ | $-24$ |
| 6 | 99 | 1 | $CaCO_3$ | 3.72 | 0.3 | 4.6 | 3.81 | 0.2 | 2.3 | | $-34$ | $-26$ |
| 7 | 99 | 1 | $BaCO_3$ | 3.82 | 0.1 | 2.1 | 3.82 | 0.2 | 2.1 | | $-27$ | $-24$ |
| 8 | 99 | 1 | $MnCO_3$ | 3.84 | 0.0 | 1.5 | 3.86 | 0.0 | 1.0 | | $-35$ | $-28$ |
| 9 | 99 | 1 | $Fe_2O_3$ | 3.82 | 0.2 | 2.1 | 3.80 | 0.4 | 2.6 | | $-29$ | $-26$ |
| 10 | 99 | 1 | CuO | 3.76 | 0.2 | 3.6 | 3.75 | 0.2 | 3.8 | | $-36$ | $-27$ |
| 11 | 99 | 1 | ZnO | 3.87 | 0.0 | 0.8 | 3.88 | 0.1 | 0.5 | $-39$ | $-38$ | $-26$ |
| 12 | 99 | 1 | $Al_2O_3$ | 3.14 | 16.5 | 19.5 | | | | | | |
| 13 | 99 | 1 | $TiO_2$ | 2.59 | 31.4 | 33.6 | | | | | | |
| 14 | 99 | 1 | NiO | 2.47 | 37.1 | 36.7 | | | | | | |
| 15 | 99 | 1 | $Y_2O_3$ | 2.52 | 32.8 | 35.4 | | | | | | |
| 16 | 99 | 1 | $SiO_2$ | 2.36 | 37.8 | 39.5 | | | | | | |
| 17 | 99 | 1 | SnO | 2.66 | 29.6 | 31.8 | | | | | | |
| 18 | 99 | 1 | $Nb_2O_5$ | 2.59 | 33.7 | 33.6 | | | | | | |

Examples 8–11 show that the addition of only 1% of the oxides or carbonates of manganese, iron, copper, and zinc is highly effective in densifying $Zr_2P_2WO_{12}$ ceramics to less than 4% total porosity, with essentially no open porosity. Example 8 contained a trace of $MnWO_4$, and Example 9 contained a very minor amount of an unidentified phase. Examples 10 and 11 exhibited only $Zr_2P_2WO_{12}$ in their XRD patterns. All samples had highly negative CTEs of $-29$ to $-38\times10^{-7}$ °C.$^{-1}$ from 25 to 50° C., and $-26$ to $-28\times10^{-7}$ °C.$^{-1}$ from 25 to 500° C.

Example 12 demonstrates that aluminum oxide also serves to lower the porosity of $Zr_2P_2WO_{12}$ ceramics; however, total porosity is still about 20%. XRD indicated the presence only of $Zr_2P_2WO_{12}$. Thermal expansion was not measured.

Examples 13–18 prove that not all oxides are effective as sintering aids for $Zr_2P_2WO_{12}$ ceramics. Thus, the addition of 1% of the oxides of titanium, nickel, yttrium, silicon, tin, and niobium, for example, yield a ceramic body containing greater than 30% porosity.

EXAMPLES 19 to 28

Powder preparation for Examples 19 and 21–28 was conducted in the same manner as Examples 1–18, with the proportions of the starting materials adjusted to yield $Zr_2P_2WO_{12}$ and $ZrW_2O_8$ in the ratios stated in Table 2. In these examples, the weight percentages of $Zr_2P_2WO_{12}$ and $ZrW_2O_8$ are relative to the sum of the weights of the $Zr_2P_2WO_{12}$ and $ZrW_2O_8$ components only. Weight percent of additive is relative to total weight percent of starting material.

TABLE 2

Experimental data for $Zr_2P_2WO_{12}$ ceramics with various amounts of $ZrW_2O_8$.

| Example Number | Weight % $Zr_2P_2WO_{12}$ | Weight % $ZrW_2O_8$ | Weight % Additive | Additive | Sample Geometry | Heating rate above 900° C. (° C./hr) | Soak Temp | Soak Time |
|---|---|---|---|---|---|---|---|---|
| 19 | 100 | 0 | 0.00 | none | 7.6 cm bar | 200 | 1150 | 4 |
| 20 | 50 | 50 | 0.00 | none | 7.6 cm bar | 100 | 1150 | 4 |
| 21 | 49 | 51 | 0.00 | none | 7.6 cm bar | 200 | 1150 | 4 |
| 22 | 32 | 68 | 0.00 | none | 7.6 cm bar | 100 | 1150 | 4 |
| 23 | 32 | 68 | 0.00 | none | 7.6 cm bar | 100 | 1150 | 4 |
| 24 | 32 | 68 | 0.00 | none | 7.6 cm bar | 25 | 1150 | 4 |
| 25 | 24 | 76 | 0.00 | none | 7.6 cm bar | 200 | 1150 | 4 |
| 26 | 10 | 91 | 0.00 | none | 7.6 cm bar | 200 | 1150 | 4 |
| 27 | 5 | 95 | 0.00 | none | 7.6 cm bar | 200 | 1150 | 4 |
| 28 | 0 | 100 | 0.00 | none | 7.6 cm bar | 200 | 1150 | 4 |
| 29 | 32 | 68 | 0.25 | AlOOH | 7.6 cm bar | 100 | 1150 | 4 |
| 30 | 32 | 68 | 0.25 | $TiO_2$ | 7.6 cm bar | 100 | 1150 | 4 |
| 31 | 32 | 68 | 0.25 | $Nb_2O_5$ | 7.6 cm bar | 100 | 1150 | 4 |
| 32 | 32 | 68 | 0.25 | $SiO_2$ | 7.6 cm bar | 100 | 1150 | 4 |
| 33 | 32 | 68 | 0.05 | $Li_2CO_3$ | 7.6 cm bar | 100 | 1150 | 4 |
| 34 | 32 | 68 | 0.10 | $Na_2CO_3$ | 7.6 cm bar | 100 | 1150 | 4 |
| 35 | 32 | 68 | 0.05 | $Na_2CO_3$ | 7.6 cm bar | 100 | 1150 | 4 |
| 36 | 32 | 68 | 0.01 | $Na_2CO_3$ | 7.6 cm bar | 100 | 1150 | 4 |
| 37 | 32 | 68 | 0.25 | $K_2CO_3$ | 7.6 cm bar | 100 | 1150 | 4 |
| 38 | 32 | 68 | 0.25 | $K_2CO_3$ | 7.6 cm bar | 25 | 1150 | 4 |
| 39 | 32 | 68 | 0.05 | $K_2CO_3$ | 7.6 cm bar | 100 | 1150 | 4 |
| 40 | 32 | 68 | 0.25 | $CaCO_3$ | 7.6 cm bar | 100 | 1150 | 4 |
| 41 | 32 | 68 | 0.25 | $CaCO_3$ | 7.6 cm bar | 25 | 1150 | 4 |
| 42 | 32 | 68 | 0.05 | $CaCO_3$ | 7.6 cm bar | 100 | 1150 | 4 |
| 43 | 32 | 68 | 0.25 | $BaCO_3$ | 7.6 cm bar | 100 | 1150 | 4 |
| 44 | 32 | 68 | 0.25 | $BaCO_3$ | 7.6 cm bar | 25 | 1150 | 4 |
| 45 | 32 | 68 | 0.10 | $BaCO_3$ | 7.6 cm bar | 100 | 1150 | 4 |
| 46 | 32 | 68 | 1.00 | MgO | 1.3 cm disc | 100 | 1150 | 4 |
| 47 | 32 | 68 | 0.25 | MgO | 7.6 cm bar | 100 | 1150 | 4 |
| 48 | 32 | 68 | 0.25 | MgO | 7.6 cm bar | 25 | 1150 | 4 |
| 49 | 32 | 68 | 0.05 | MgO | 7.6 cm bar | 100 | 1150 | 4 |
| 50 | 32 | 68 | 1.00 | CuO | 1.3 cm disc | 100 | 1150 | 4 |
| 51 | 32 | 68 | 0.25 | CuO | 7.6 cm bar | 100 | 1150 | 4 |
| 52 | 32 | 68 | 0.05 | CuO | 7.6 cm bar | 100 | 1150 | 4 |
| 53 | 32 | 68 | 1.00 | ZnO | 1.3 cm disc | 100 | 1150 | 4 |

TABLE 2-continued

Experimental data for $Zr_2P_2WO_{12}$ ceramics with various amounts of $ZrW_2O_8$.

| Example Number | Weight % $Zr_2P_2WO_{12}$ | Weight % $ZrW_2O_8$ | Weight % Additive | Additive | Sample Geometry | Heating rate above 900° C. (° C./hr) | Soak Temp | Soak Time |
|---|---|---|---|---|---|---|---|---|
| 54 | 32 | 68 | 1.00 | ZnO | 7.6 cm bar | 100 | 1150 | 4 |
| 55 | 32 | 68 | 0.25 | ZnO | 7.6 cm bar | 100 | 1150 | 4 |
| 56 | 32 | 68 | 0.25 | ZnO | 7.6 cm bar | 25 | 1150 | 4 |
| 57 | 32 | 68 | 0.10 | ZnO | 7.6 cm bar | 100 | 1150 | 4 |
| 58 | 32 | 68 | 1.00 | $MnCO_3$ | 1.3 cm disc | 100 | 1150 | 4 |
| 59 | 32 | 68 | 1.00 | $MnCO_3$ | 7.6 cm bar | 100 | 1150 | 4 |
| 60 | 32 | 68 | 0.25 | $MnCO_3$ | 7.6 cm bar | 100 | 1150 | 4 |
| 61 | 32 | 68 | 0.25 | $MnCO_3$ | 7.6 cm bar | 25 | 1150 | 4 |
| 62 | 32 | 68 | 0.05 | $MnCO_3$ | 7.6 cm bar | 100 | 1150 | 4 |
| 63 | 32 | 68 | 1.00 | $Fe_2O_3$ | 1.3 cm disc | 100 | 1150 | 4 |
| 64 | 32 | 68 | 1.00 | $Fe_2O_3$ | 7.6 cm bar | 100 | 1150 | 4 |
| 65 | 32 | 68 | 0.25 | $Fe_2O_3$ | 7.6 cm bar | 100 | 1150 | 4 |
| 66 | 32 | 68 | 0.50 | $Y_2O_3$ | 11.4 cm bar | 100 | 1150 | 4 |
| 67 | 32 | 68 | 0.25 | $Y_2O_3$ | 7.6 cm bar | 100 | 1150 | 4 |
| 68 | 32 | 68 | 0.25 | $Y_2O_3$ | 11.4 cm bar | 100 | 1150 | 4 |
| 69 | 32 | 68 | 0.25 | $Y_2O_3$ | 11.4 cm bar | 100 | 1150 | 4 |
| 70 | 32 | 68 | 0.12 | $Y_2O_3$ | 11.4 cm bar | 100 | 1150 | 4 |
| 71 | 32 | 68 | 0.05 | $Y_2O_3$ | 11.4 cm bar | 100 | 1150 | 4 |
| 72 | 32 | 68 | 0.05 | $Y_2O_3$ | 11.4 cm bar | 100 | 1150 | 4 |
| 73 | 32 | 68 | 0.05 | $Y_2O_3$ | 11.4 cm bar | 100 | 1150 | 4 |
| 74 | 25 | 75 | 0.05 | $Y_2O_3$ | 11.4 cm bar | 100 | 1150 | 4 |
| 75 | 25 | 75 | 0.05 | $Y_2O_3$ | 11.4 cm bar | 450 | 1175 | 4 |
| 76 | 25 | 75 | 0.05 | $Y_2O_3$ | 11.4 cm bar | 450 | 1175 | 8 |
| 77 | 15 | 85 | 0.05 | $Y_2O_3$ | 11.4 cm bar | 450 | 1175 | 8 |
| 78 | 10 | 88* | 0.05 | $Y_2O_3$ | 11.4 cm bar | 450 | 1175 | 6 |
| 79 | 32 | 68 | 0.25 | $La_2O_3$ | 7.6 cm bar | 100 | 1160 | 4 |
| 80 | 32 | 68 | 0.25 | $CeO_2$ | 7.6 cm bar | 100 | 1160 | 4 |
| 81 | 32 | 68 | 0.25 | $MoO_3$ | 7.6 cm bar | 100 | 1160 | 4 |
| 82 | 32 | 68 | 0.25 | $Bi_2O_3$ | 7.6 cm bar | 100 | 1160 | 4 |
| 83 | 32 | 68 | 0.25 | $B_2O_3$ | 7.6 cm bar | 100 | 1160 | 4 |
| 84 | 32 | 68 | 0.25 | $Ga_2O_3$ | 7.6 cm bar | 100 | 1160 | 4 |
| 85 | 32 | 68 | 0.25 | $In_2O_3$ | 7.6 cm bar | 100 | 1160 | 4 |
| 86 | 32 | 68 | 0.25 | SnO | 7.6 cm bar | 100 | 1160 | 4 |
| 87 | 32 | 68 | 0.25 | $Cr_2O_3$ | 7.6 cm bar | 100 | 1160 | 4 |
| 88 | 32 | 68 | 0.25 | NiO | 7.6 cm bar | 100 | 1160 | 4 |

*Example 78 also contains 2% tungsten oxide as an additional phase.

Example 20 was prepared by precipitation from aqueous solutions of $ZrOCl_2 \cdot 8H_2O$, $NH_4H_2PO_4$, and $H_2WO_4$. According to this method, 79.18 grams of zirconyl chloride (previously assayed to be $2.739 \times 10^{-3}$ moles Zr per gram of salt) was dissolved in 161 grams of water to form the first solution. A second solution was formed by dissolving 16.63 grams of ammonium dihydrogen phosphate in 73 grams of water. A third solution was made by dissolving 54.19 grams of tungstic acid in 152 grams of water and 54 grams of 14.8 N ammonium hydroxide solution, and heating to 95° C. The tungsten and phosphate solutions were mixed together and then added to the zirconium solution. More ammonium hydroxide was added to the mixture to deflocculate the suspension. The slurry was stirred and heated to 85° C. until dry. The solid was then calcined at 900° C. for 4 hours and subsequently crushed and vibratory milled in isopropanol for 14 hours with zirconia media.

Mixed powders for Examples 19–28 were pressed into 7.6 cm long bars at 70 Mpa. Samples were set on zirconia sand in covered alumina boxes and fired at about 30° C./hr to 350° C., then heated at rate ranging from 25° C./hr to 200° C./hr to 1150° C. and held at that temperature for 4 hours. After 4 hours, the alumina boxes were removed from the furnace and the samples immediately taken from the boxes and transferred to a zirconia sand-covered alumina pallet which was at room temperature. The rapid cooling of the samples prevented the decomposition of the metastable $ZrW_2O_8$ phase into $ZrO_2 + WO_3$ below about 1140° C.

After firing, samples were inspected for appearance and, in some cases, further characterized for porosity, phase assemblage, and CTE. Properties of fired samples are reported in Table 3.

TABLE 3

Experimental data for $Zr_2P_2WO_{12}$ ceramics with various amounts of $ZrW_2O_8$.

| Example Number | Appearance | Bulk Density (g/cm³) | Theoretical Density | % Total Porosity | Mean Coefficient of Thermal Expansion ($10^{-7}$ °C.$^{-1}$) −40 to +85° C. | |
|---|---|---|---|---|---|---|
| 19 | no cracks | 2.47 | 3.90 | 36.7 | −40 | |
| 20 | no cracks | | | | −61 | * |
| 21 | no cracks | 3.24 | 4.43 | 26.8 | −66 | * |
| 22 | no cracks | | | | −72 | |
| 23 | no cracks | 3.12 | 4.63 | 32.5 | −72 | |
| 24 | no cracks | | | | | |
| 25 | no cracks | 3.66 | 4.74 | 22.7 | −76 | |
| 26 | no cracks | 4.03 | 4.94 | 18.4 | −83 | |
| 27 | no cracks | 4.27 | 5.01 | 14.7 | −85 | |
| 28 | no cracks | 4.43 | 5.08 | 12.8 | −90 | |
| 29 | no cracks | 4.42 | 4.63 | 4.6 | −71 | * |
| 30 | no cracks | 4.06 | 4.63 | 12.3 | −73 | * |
| 31 | no cracks | 3.97 | 4.63 | 14.3 | −80 | |
| 32 | no cracks | 3.52 | 4.63 | 24.0 | −79 | |
| 33 | scattered | 4.07 | 4.63 | 12.1 | | |
| 34 | no cracks | 4.35 | 4.63 | 6.0 | | |
| 35 | no cracks | 3.81 | 4.63 | 17.8 | | |
| 36 | no cracks | 3.16 | 4.63 | 31.8 | | |
| 37 | extremely | 4.38 | 4.63 | 5.4 | | |
| 38 | highly cracked | | | | | |
| 39 | no cracks | 3.81 | 4.63 | 17.7 | | |
| 40 | extremely | 4.49 | 4.63 | 3.1 | | |
| 41 | extremely | | | | | |
| 42 | no cracks | 4.30 | 4.63 | 7.1 | | |
| 43 | very few | 4.54 | 4.63 | 2.0 | −70 | |
| 44 | scattered | | | | | |
| 45 | no cracks | 4.45 | 4.63 | 3.9 | −72 | |
| 46 | slumped | 4.35 | 4.63 | 6.1 | | |
| 47 | extremely | 4.56 | 4.63 | 1.5 | | |
| 48 | scattered | | | | | |
| 49 | no cracks | 4.51 | 4.63 | 2.6 | | |
| 50 | no cracks | 4.46 | 4.63 | 3.7 | | |
| 51 | scattered | 4.58 | 4.63 | 1.1 | | |
| 52 | no cracks | 4.20 | 4.63 | 9.4 | | |
| 53 | open cracks | 4.43 | 4.63 | 4.4 | | |
| 54 | crazed | | | | | |
| 55 | extremely | 4.55 | 4.63 | 1.8 | | |
| 56 | no cracks | | | | −71 | * |
| 57 | no cracks | 4.51 | 4.63 | 2.6 | −70 | |
| 58 | open cracks | 4.47 | 4.63 | 3.5 | | |
| 59 | open cracks | | | | | |
| 60 | highly cracked | 4.54 | 4.63 | 2.0 | | |
| 61 | highly cracked | | | | | |
| 62 | no cracks | 4.15 | 4.63 | 10.4 | | |
| 63 | open cracks | 4.46 | 4.63 | 3.7 | | |
| 64 | open cracks | | | | | |
| 65 | no cracks | 4.51 | 4.63 | 2.6 | −75 | |
| 66 | moderately | | | | | |
| 67 | no cracks | 4.38 | 4.63 | 5.4 | −77 | |
| 68 | no cracks | | | | −67 | |
| 69 | no cracks | | | | −70 | |
| 70 | no cracks | 4.27 | 4.63 | 7.8 | −66 | * |
| 71 | no cracks | 3.79 | 4.63 | 18.1 | −68 | * |
| 72 | no cracks | 4.44 | 4.63 | 4.1 | −68 | * |
| 73 | no cracks | | | | −69 | |
| 74 | no cracks | | | | −68 | |
| 75 | no cracks | | | | −70 | |
| 76 | no cracks | | | | −74 | |
| 77 | no cracks | | | | −79 | |
| 78 | no cracks | 4.79 | 4.96 | 3.6 | −84 | |
| 79 | scattered | 4.51 | 4.63 | 2.6 | | |
| 80 | very few | 4.52 | 4.63 | 2.3 | | |
| 81 | no cracks | 3.01 | 4.63 | 35.0 | | |
| 82 | no cracks | 4.52 | 4.63 | 2.4 | | |
| 83 | no cracks | 3.22 | 4.63 | 30.4 | | |
| 84 | very few | 4.51 | 4.63 | 2.7 | | |
| 85 | no cracks | 3.14 | 4.63 | 32.3 | | |
| 86 | no cracks | 3.19 | 4.63 | 31.1 | | |
| 87 | no cracks | 3.32 | 4.63 | 28.3 | | |
| 88 | extremely | 4.54 | 4.63 | 2.0 | | |

* mean CTE from −40° to +40° C.

With increasing addition of $ZrW_2O_8$ to $Zr_2P_2WO_{12}$, the amount of porosity in the ceramic body decreases, and the thermal expansion becomes progressively more negative, reaching $-90 \times 10^{-7}$ °C.$^{-1}$ for 100% $ZrW_2O_8$ as shown in FIG. 1. For the preferred range of CTE between −70 and $-85 \times 10^{-7}$ °C.$^{-1}$ desired for athermalization of fiber Bragg gratings, the amount of $Zr_2P_2WO_{12}$ is between about 5% and 40%, and the amount of $ZrW_2O_8$ is between about 60% and 95%. For the preferred range of CTE between −65 and $-80 \times 10^{-7}$ °C.$^{-1}$ desired for athermalization of fiber Bragg gratings, the amount of $Zr_2P_2WO_{12}$ is between about 10% and 50%, and the amount of $ZrW_2O_8$ is between about 50% and 90%.

EXAMPLES 29 to 88

Powder preparation for Examples 29 to 88 was conducted in the same manner as Examples 1–18, with the proportions of the starting materials adjusted to yield $Zr_2P_2WO_{12}$ and $ZrW_2O_8$ in the ratios stated in Table 2, with the following exceptions: Example 68 was prepared using $ZrO_2$, $WO_3$, and a $ZrP_2O_7$ powder prepared by calcination of acid zirconium phosphate at 1050° C. for 4 hours, and Examples 69 and 73–78 were prepared from $ZrO_2$, $WO_3$, and pre-reacted $Zr_2P_2WO_{12}$. The pre-reacted $Zr_2P_2WO_{12}$ was formed by dry ball milling a mixture of $ZrO_2$, $WO_3$ and acid zirconium phosphate in the appropriate ratios and calcining the mixture at 1050° C. for 4 hours. Also, the powders for Examples 72 to 78 were milled in water instead of isopropanol. Examples 29 to 88 were formulated to yield ceramics with coefficients of thermal expansion between −65 and −85×10$^{-7}$° C.$^{-1}$.

In these examples, the weight percentages of $Zr_2P_2WO_{12}$ and $ZrW_2O_8$ are relative to the sum of the weights of the $Zr_2P_2WO_{12}$ and $ZrW_2O_8$ components only. Weight percent of additive is relative to total weight percent of starting material.

Example 29 shows that 0.25% aluminum monohydrate is an effective sintering aid in reducing the porosity of a 68%$ZrW_2O_8$-32%$Zr_2P_2WO_{12}$ ceramic to 4.6%. The fired sample exhibited good integrity, with no cracking.

Example 30 shows that 0.25% addition of titania reduces porosity of a 68%$ZrW_2O_8$-32%$Zr_2P_2WO_{12}$ ceramic to about 12% with no cracking.

Example 31 illustrates that 0.25% addition of niobium oxide reduces the porosity of a 68%$ZrW_2O_8$-32%$Zr_2P_2WO_{12}$ ceramic to about 14% with no cracking.

Example 32 demonstrates that 0.25% silica addition is not effective as a sintering aid for 68%$ZrW_2O_8$-32%$Zr_2P_2WO_{12}$ ceramics.

Example 33 shows that although 0.05% lithium carbonate (equivalent to 0.02% $Li_2O$) reduces porosity of a 68%$ZrW_2O_8$-32%$Zr_2P_2WO_{12}$ ceramic, this amount of additive results in scattered cracks.

Example 34 illustrates that 0.10% sodium carbonate (equivalent to 0.06% $Na_2O$) reduces the porosity of the 68%$ZrW_2O_8$-32%$Zr_2P_2WO_{12}$ composition to only 6%, without cracking. Example 35 shows that the amount of $Na_2CO_3$ can be reduced to 0.05% (0.03% $Na_2O$) and still reduce porosity to 17.8%. However, Example 36 shows that 0.01% sodium carbonate (0.006% $Na_2O$) is not sufficient to reduce the porosity of this ceramic composition.

Example 37 illustrates that although 0.25% potassium carbonate (equivalent to 0.17% $K_2O$) is a very effective sintering aid for the 68%$ZrW_2O_8$-32%$Zr_2P_2WO_{12}$ composition, reducing porosity to 5.4%, the ceramic body exhibits extreme cracking after firing. Example 38 shows that slowing the heating rate to 25° C./hour above 1100° C. does not eliminate the cracking of this composition. Thus, the amount of $K_2O$ present in a 68%$ZrW_2O_8$-32%$Zr_2P_2WO_{12}$ ceramic must be less than 0.17% to avoid cracking. Example 39 demonstrates that even 0.05% $K_2CO_3$ (0.034% $K_2O$) is effective as a densification aid for these ceramics.

Examples 40 and 41 demonstrate that addition of 0.25% calcium carbonate (0.14% CaO) is also very effective in reducing porosity; however, samples are extremely cracked after firing. Thus, the amount of CaO in a 68%$ZrW_2O_8$-32%$Zr_2P_2WO_{12}$ ceramic must be less than 0.14% to avoid cracking. Example 42 shows that even only 0.05% $CaCO_3$ (0.03% CaO) is sufficient to substantially reduce the porosity in these ceramics.

Examples 43 and 44 show that the addition of 0.25% barium carbonate (0.19% BaO) is effective in reducing porosity to 2.0%; however, the sintered body exhibits a small amount of cracking. Example 45 shows that reduction of the amount of barium carbonate to 0.1% (0.08% BaO) is still effective in lowering porosity to less than 4%, and results in a crack-free body. Thus, the amount of BaO should be less than about 0.19% to avoid cracking.

Example 46 demonstrates that the addition of 1.0% magnesium oxide, MgO, to the 68%$ZrW_2O_8$-32%$Zr_2P_2WO_{12}$ composition results in the formation of excessive liquid, so that the body underwent considerable slumping. Examples 47 and 48 show that reduction in the MgO concentration to 0.25% yielded a cracked body that was otherwise well densified. Example 49 demonstrates that addition of only 0.05% MgO still yields a low-porosity body which is also free of cracks. Thus, the amount of MgO must be less than 0.25% to avoid cracking.

Examples 50 and 51 show that 1.0% or 0.25% cupric oxide, CuO, is effective in lowering porosity of the 68%$ZrW_2O_8$-32%$Zr_2P_2WO_{12}$ composition. However, XRD revealed considerable amounts of zirconium oxide and tungsten oxide in the fired body which are undesirable for strongly negative CTE. However, 0.05% CuO addition (Example 52) still yields a low-porosity ceramic, while maintaining the $ZrW_2O_8$ and $Zr_2P_2WO_{12}$ phases with essentially no secondary zirconium or tungsten oxides. Thus, the amount of CuO should be less than about 0.25% to prevent the formation of excessive amounts of $ZrO_2$ and $WO_3$ in the fired ceramic.

Examples 53 and 54 illustrate that addition of 1.0% zinc oxide, ZnO, to the 68%$ZrW_2O_8$-32%$Zr_2P_2WO_{12}$ composition is effective in reducing porosity, but results in cracking of the body. Examples 55 and 56 show that reduction of the amount of ZnO to 0.25% is still useful in densifying the ceramic, and can result in a crack-free body when the heating rate above 1100° C. is less than 100° C./hour. Further lowering of the amount of ZnO to 0.1% results in a dense, crack-free body even for heating rates of 100° C./hour (Example 57).

Examples 58 and 59 demonstrate that 1.0% manganese carbonate (yielding 0.62% MnO) is effective in densifying 68%$ZrW_2O_8$-32%$Zr_2P_2WO_{12}$ ceramics, but produces cracking in the fired body. Examples 60 and 61 show that 0.25% $MnCO_3$ (0.15% MnO) still reduces porosity to low levels, but cracking is present. Example 62 shows that 0.05% $MnCO_3$ (0.03% MnO) is still effective as a sintering aid, and does not produce cracking. Thus, the amount of MnO in the %$ZrW_2O8$-32%$Zr_2P_2WO_{12}$ ceramic must be less than about 0.15% to prevent crack formation during sintering.

Examples 63 and 64 illustrate that 1.0% ferric oxide, $Fe_2O_3$, is effective as a sintering aid for %$ZrW_2O_8$-32%$Zr_2P_2WO_{12}$ ceramics, but results in cracking. Example 65 shows that 0.25% $Fe_2O_3$ yields a low-porosity, uncracked body. Thus, the amount of $Fe_2O_3$ to be used as a sintering aid for the 68%$ZrW_2O_8$-32%$Zr_2P_2WO_{12}$ composition is preferably less than 1.0% to avoid cracking.

Example 66 shows that addition of 0.50% yttrium oxide, $Y_2O_3$, yields a cracked body of 68%$ZrW_2O_8$-32%$Zr_2P_2WO_{12}$ composition. Example 67 shows that reducing the yttria to 0.25% eliminates cracking and still reduces porosity to 5.4%. Example 68 demonstrates that the phosphorus can be supplied as $ZrP_2O$ powder. Example 69 shows that the phosphorus can be supplied as pre-reacted $Zr_2P_2WO_{12}$ powder. Example 70 illustrates that the amount of yttria can be reduced to 0.12% and still yield a 68%$ZrW_2O_8$-32%$Zr_2P_2WO_{12}$ ceramic with low porosity without cracking. Example 71 shows that reduction of the amount of yttria to only 0.05% results in an increase in porosity to 18.1% when the powders are milled in isopropanol. However, Example 72 demonstrates that 0.05% yttria is sufficient to serve as an effective densification aid when the powders are milled in water. Example 73 shows that phosphorus may be supplied as pre-reacted $Zr_2P_2WO_{12}$ powder to the raw material mixture.

Example 74 demonstrates that a ceramic comprised of 75% $ZrW_2O_8$ and 25% $Zr_2P_2WO_{12}$ with 0.05% yttria additive is uncracked and possesses a CTE of $-68 \times 10^{-7}$ $C.^{-1}$. Examples 75 and 76 show that this composition may be fired at 1175° C. for 4 to 8 hours.

Example 77 shows that the amount of $ZrW_2O_8$ can be increased to 85 weight % with 0.05% yttria as a sintering aid to yield a crack-free sample with a CTE of $-79 \times 10^{-7}$ $C.^{-1}$.

Example 78 shows that the amount of $ZrW_2O_8$ can be further increased to 88 weight % with 0.05% yttria as a sintering aid to yield a crack-free, low-porosity ceramic with a CTE of $-84 \times 10^{-7}$ $C.^{-1}$. Example 78 also contains an addition of about 2 weight % excess tungsten oxide as a separate phase, in addition to the 10 weight % $Zr_2P_2WO_{12}$.

Examples 79 and 80 show that addition of 0.25% of the oxides of the rare earth metals lanthanum and cerium are very effective at reducing the porosity of 68% $ZrW_2O_8$ and 32% $Zr_2P_2WO_{12}$ bodies to less than 3%. Slight cracking of these compositions shows that the amount of $La_2O_3$ or $CeO_2$ additive is preferably less than 0.25%.

Example 81 demonstrates that the addition of 0.25% $MoO_3$ is not effective as a sintering aid for 68% $ZrW_2O_8$ and 32% $Zr_2P_2WO_{12}$ ceramics.

Example 82 illustrates that 0.25% bismuth oxide greatly lowers the porosity of 68% $ZrW_2O_8$ and 32% $Zr_2P_2WO_{12}$ bodies, and that no cracking is present.

Example 83 shows that addition of 0.25% $B_2O_3$ to a 68% $ZrW_2O_8$ and 32% $Zr_2P_2WO_{12}$ body does not significantly reduce porosity.

Example 84 demonstrates that 0.25% gallium oxide is highly effective in lowering the porosity of 68% $ZrW_2O_8$ and 32% $Zr_2P_2WO_{12}$ ceramics. However, amounts less than 0.25 weight % are preferred to avoid cracking.

Examples 85, 86, and 87 illustrate that 0.25% addition of the oxides of indium, or tin, or chromium is not greatly effective in reducing the porosity of 68% $ZrW_2O_8$ and 32% $Zr_2P_2WO_{12}$ bodies.

Example 88 shows that addition of 0.25% nickel oxide to the 68% $ZrW_2O_8$ and 32% $Zr_2P_2WO_{12}$ composition reduces porosity to very low levels; however, the amount of NiO is preferably less than 0.25% to prevent cracking of the ceramic.

COMPARATIVE EXAMPLES

Although the thermal expansion coefficient of zirconium tungstate is more strongly negative than that which is required for athermalization of a fiber Bragg grating, ceramic bodies having the desired thermal expansion can be prepared from mixtures of $ZrW_2O_8$ with one or more additional phases whose CTEs are either positive or less negative than that of zirconium tungstate. The amount of additional phases that would be required to yield a ceramic having a specific CTE can be estimated from the relation $$\alpha_m = V_1\alpha_1 + V_2\alpha_2 + V_3\alpha_3 + \ldots + V_n\alpha_n \quad \text{(Equation 1)}$$

in which $\alpha_m$ is the coefficient of thermal expansion of the mixture, $\alpha_1$ is the CTE of component 1, chosen to be $ZrW_2O_8$, $\alpha_2$ is the CTE of component 2, etc. for n phases, and $V_1, V_2, \ldots V_n$ are the volume fractions of components 1 ($ZrW_2O_8$), 2, etc. Equation 1 is only approximate, because it does not take into account the effect of the different elastic moduli of the various phases, or the possibility of microcracking.

The terms in Equation 1 refer to the actual volume fractions of the phases that are present in the fired ceramic. For a given mixture of starting materials, one must understand the phase relations for that system at the temperature to which the body is fired. Addition of a metal oxide to the $ZrW_2O_8$ precursor (such as $ZrO_2 + WO_3$) does not ensure that the fired ceramic will consist only of $ZrW_2O_8$ plus that metal oxide. In many instances, the metal oxide additive will react with the zirconium tungstate to form two or more new phases. In order to achieve the desired CTE in the fired ceramic, it is necessary to know the phases that will form, the volume fractions of those phases, and their CTEs, so that the amount of metal oxide additive(s) can be judiciously selected.

In the comparative examples described below, oxide compounds having positive coefficients of thermal expansion were added to zirconium and tungsten oxides in amounts that nominally would yield $ZrW_2O_8$-based ceramics having mean CTEs of about $-75 \times 10^{-7}$ $C.^{-1}$ if the oxide additives remained unreacted during firing of the ceramic. The amount of metal oxide second phase that would be required to yield a ceramic having this CTE was computed from the relation $$\alpha_m = -75 \times 10^{-7} \ C.^{-1} = V_{zw}\alpha_{zw} + V_{mo}\alpha_{mo} \quad \text{(Equation 2)}$$

in which $\alpha_m$ is the mean coefficient of thermal expansion of the mixture near 25° C., chosen to be $-75 \times 10^{-7}$ $C.^{-1}$, $\alpha_{zw}$ is the mean CTE of $ZrW_2O_8$ near 25° C., which is about $-90 \times 10^{-7}$ $C.^{-1}$, $\alpha_{mo}$ is the mean CTE of the metal oxide added as the oxide or added as its precursor, and $V_{zw}$ and $V_{mo}$ are the volume fractions of $ZrW_2O_8$ and metal oxide, respectively.

The compositions of the examples are provided in Table 4. Table 5 lists the appearances of the samples and their phase compositions after firing as determined by X-ray diffractometry. CTE was measured by dilatometry.

TABLE 4

Experimental data for ZrW$_2$O$_3$ ceramics with various amounts of second phase additives

| Example Number | Weight % ZrW$_2$O$_8$ | Volume % ZrW$_2$O$_8$ | Additive | Weight % Additive | Volume % Additive as Oxide | Nominal CTE of Oxide (25–100° C.) | Sample Geometry | Heating rate above 1100° C. (° C./hr) | Soak Temperature (° C.) | Soak Time (hours) |
|---|---|---|---|---|---|---|---|---|---|---|
| C1 | 90.4 | 88 | Al$_2$O$_3$ | 9.6 | 12 | 70 | 11.4 cm bar | 100 | 1150 | 4 |
| C2 | 90.4 | 88 | Al$_2$O$_3$ | 9.6 | 12 | 70 | 11.4 cm bar | 450 | 1200 | 8 |
| C3 | 93.5 | 91 | MgO | 6.5 | 9 | 120 | 11.4 cm bar | 100 | 1150 | 4 |
| C4 | 89.7 | 91 | CaCO$_3$ | 10.3 | 9 | 130 | 11.4 cm bar | 100 | 1150 | 4 |
| C5 | 88.1 | 88 | Y$_2$O$_3$ | 11.9 | 12 | 70 | 11.4 cm bar | 100 | 1150 | 4 |
| C6 | 88.1 | 88 | Y$_2$O$_3$ | 11.9 | 12 | 70 | 11.4 cm bar | 450 | 1200 | 8 |
| C7 | 86.3 | 88 | ZrO$_2$ | 13.7 | 12 | 70 | 11.4 cm bar | 100 | 1150 | 4 |
| C8 | 86.3 | 88 | ZrO$_2$ | 13.7 | 12 | 70 | 11.4 cm bar | 450 | 1200 | 8 |
| C9 | 90.8 | 81 | Fused SiO$_2$ | 9.2 | 19 | 5 | 11.4 cm bar | 100 | 1150 | 4 |
| C10 | 90.8 | 81 | Fused SiO$_2$ | 9.2 | 19 | 5 | 11.4 cm bar | 450 | 1200 | 8 |
| C11 | 95.1 | 91 | Quartz SiO$_2$ | 4.9 | 9 | 120 | 11.4 cm bar | 100 | 1150 | 4 |
| C12 | 95.1 | 91 | Quartz SiO$_2$ | 4.9 | 9 | 120 | 11.4 cm bar | 450 | 1200 | 8 |
| C13 | 85.0 | 83.6 | ZrSiO$_4$ | 15 | 16.4 | 40 | 7.6 cm bar | 100 | 1175 | 8.5 |

TABLE 5

Experimental data for ZrW$_2$O$_8$ ceramics with various amounts of second phase additives

| Example Number | Appearance | Crystalline Phases (Powder XRD) | Mean Coefficient of Thermal Expansion (10$^{-7°}$ C.$^{-1}$) −40 to +85° C. | CTE predicted by weighted average of starting oxides (10$^{-7°}$ C.$^{-1}$) |
|---|---|---|---|---|
| C1 | Sintered bar | Al$_2$(WO$_4$)$_3$, ZrO$_2$ | +100 | −75 |
| C2 | Severely slumped bar; severe sticking | Al$_2$(WO$_4$)$_3$, ZrO$_2$, Al$_2$O$_3$ | ** | −75 |
| C3 | Slumped bar; severe sticking | MgWO$_4$, ZrO$_2$, unidentified phase(s) | ** | −76 |
| C4 | Severely slumped bar; severe sticking | CaWO$_4$, ZrO$_2$, unidentified phase(s) | ** | −75 |
| C5 | Concave surfaces; severe sticking | ZrO$_2$, unidentified phase(s) | +101 | −75 |
| C6 | Deformed, tapered bar; sticking | ZrO$_2$, unidentified phase(s) |  | −75 |
| C7 | Chalky surface | ZrW$_2$O$_8$, ZrO$_2$ |  | −75 |
| C8 | Chalky surface | ZrW$_2$O$_8$, ZrO$_2$ | −68 | −75 |
| C9 | Sintered bar, slightly chalky surface | ZrSiO$_4$, WO$_3$, cristobalite, ZrO$_2$ |  | −76 |
| C10 | Sintered bar, slightly chalky surface | ZrSiO$_4$, WO$_3$, cristobalite | +64 | −76 |
| C11 | Sintered bar, slightly chalky surface | ZrW$_2$O$_8$, ZrSiO$_4$, WO$_3$, cristobalite, ZrO$_2$ |  | −76 |
| C12 | Sintered bar, hard surface | ZrW$_2$O$_8$, ZrSiO$_4$, WO$_3$ | −61 | −76 |
| C13 | Sintered bar, hard surface | ZrW$_2$O$_8$, ZrSiO$_4$, trace WO$_3$ | −51 | −69 |

** Too deformed for CTE measurement

Samples were prepared by vibratory milling the powders in water for 16 hours, adding a polyethylene glycol binder, drying the slurry, granulating the dried cake, and uniaxially pressing bars of 11.4 cm length, except for Example C13, which was pressed into a bar of 7.6 cm length. Bars were set on zirconium oxide "sand" in an alumina box and fired at 1150° C. or 1175° C., or were set on zircon "sand" on an aluminosilicate pallet and fired at 1200° C. (Table 4).

Examples C1 and C2 were prepared to yield a ceramic with a nominal composition of 88 volume % ZrW$_2$O$_8$+12 volume % (9.6 weight %) Al$_2$O$_3$. However, the results in Table 5 demonstrate that ZrW$_2$O$_8$ is unstable when fired with alumina, and reacts to form Al$_2$(WO$_4$)$_3$+ZrO$_2$. This results in a positive CTE for this material of +100×10$^{-7°}$ C.$^{-1}$. Thus, the concept of forming a ZrW$_2$O$_8$+Al$_2$O$_3$ ceramic is untenable, because no such ceramic can be produced due to reaction of alumina with zirconium tungstate. However, it is contemplated that a ceramic article consisting of ZrW$_2$O$_8$ with small amounts of Al$_2$(WO$_4$)$_3$ could be fabricated by addition of aluminum and tungsten oxides to the ZrW$_2$O$_8$ precursor powders, and the amount of Al$_2$(WO$_4$)$_3$ in such a ceramic could be selected so as to yield a body with a CTE that is less negative than −90×10$^{-7°}$ C.$^{-1}$. Also, it is contemplated that a body comprised of ZrW$_2$O$_8$+Al$_2$(WO$_4$)$_3$+ZrO$_2$ having a CTE less negative than −90×10$^{-7°}$ C.$^{-1}$ could be prepared by adding only alumina, provided that the alumina addition is much less than 9.6 weight %.

Example C3 was prepared to yield a ceramic with a nominal composition of 91 volume % ZrW$_2$O$_8$+9 volume % (6.5 weight %) MgO. However, as seen in Table 5, this composition, even when fired at only 1150° C. (just above the lower thermal stability limit of ZrW$_2$O$_8$), undergoes reaction between ZrW$_2$O$_8$ and MgO to form MgWO$_4$+ZrO$_2$+unidentified phases. No ZrW$_2$O$_8$ remains in the body, and the remaining phases all have large positive CTEs, making this ceramic inappropriate for use as a substrate for a fiber Bragg grating. Furthermore, the ceramic body underwent slumping and sticking to the zirconia sand due to extensive formation of liquid during firing. Thus, the formation of a ZrW$_2$O$_8$+MgO ceramic is not feasible, because no such ceramic can be produced. Instead, MgO reacts with ZrW$_2$O$_8$ to form phases other than MgO. Addition of MgO to ZrW$_2$O$_8$ in amounts of more than a few weight percent is undesirable.

Example C4 was prepared to yield a ceramic with a nominal composition of 91 volume % ZrW$_2$O$_8$+9 volume % Cao, in which the CaO was provided as 10.3 weight % CaCO$_3$. However, as seen in Table 5, this composition, even when fired at only 1150° C., undergoes reaction between ZrW$_2$O$_8$ and CaO to form CaWO$_4$+ZrO$_2$+unidentified phases. No ZrW$_2$O$_8$ remains in the body, and the remaining phases all have large positive CTEs (the CTE of $CaWO_4$ is about $100 \times 10^{-7}$ °$C.^{-1}$), making this ceramic inappropriate for use as a substrate for a fiber Bragg grating. Furthermore, the ceramic body underwent severe slumping and sticking to the zirconia sand due to extensive formation of liquid during firing. Thus, the formation of a $ZrW_2O_8+CaO$ ceramic is not feasible, because no such ceramic can be produced. Instead, CaO reacts with $ZrW_2O_8$ to form phases other than CaO. Addition of CaO, or a CaO source such as $CaCO_3$, to $ZrW_2O_8$ in amounts of more than a few weight percent is undesirable.

Examples C5 and C6 were formulated to yield a ceramic with a nominal composition of 88 volume % $ZrW_2O_8$+12 volume % (11.9 weight %) $Y_2O_3$. However, Table 5 shows that, after firing, the ceramic contained no $ZrW_2O_8$. Instead, reaction of the starting materials yielded $ZrO_2$, and several unidentified phases. The high CTE resulting from this reaction, $+101 \times 10^{-7}$ °$C.^{-1}$, demonstrates that the amount of yttria in a zirconium tungstate ceramic should be kept to less than a few percent.

Figure 2:
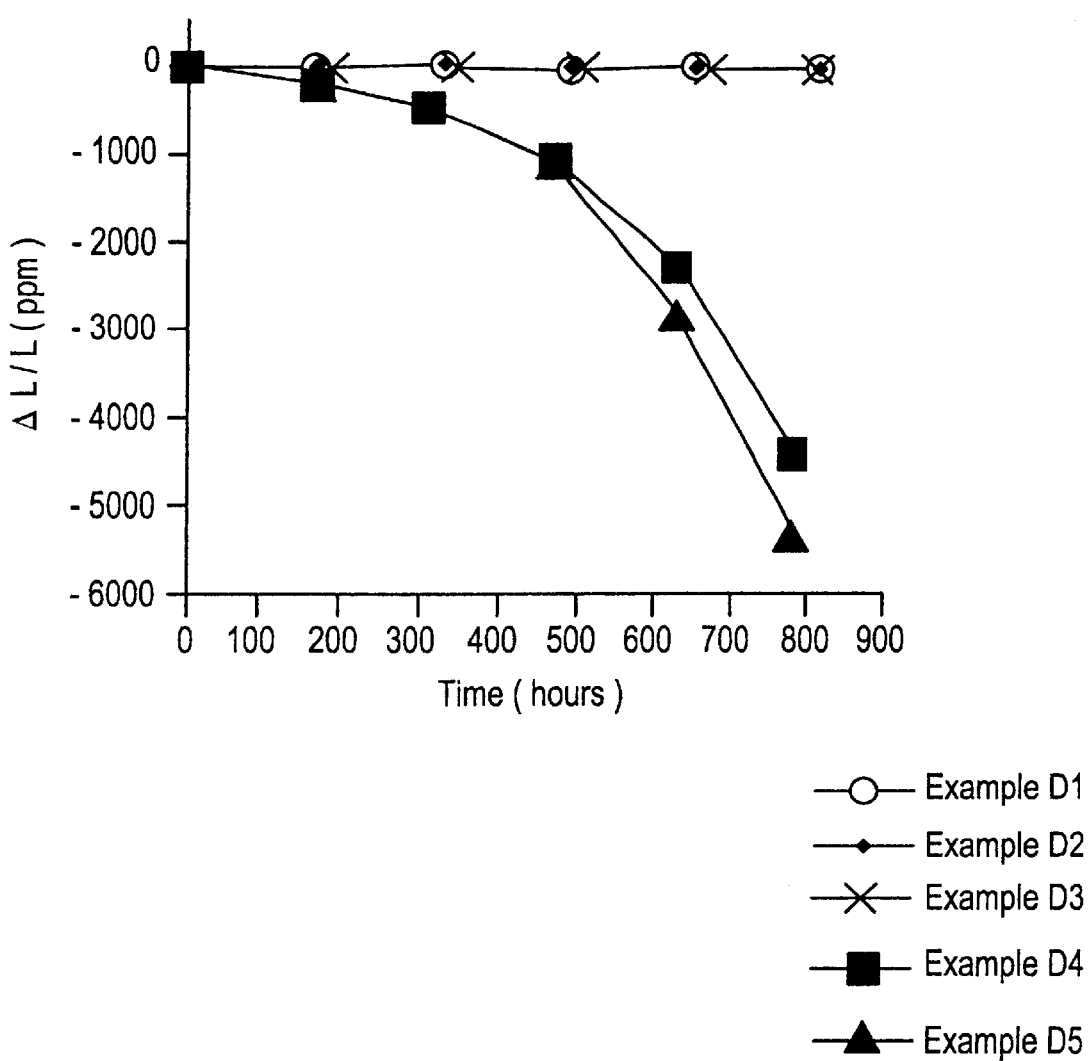
FIG. 2 shows the dimensional change of sample bars of $ZrW_2O_8$ with 15 weight percent $ZrO_2$ at 85° C. and 85% relative humidity compared with the dimensional changes of inventive bodies under the same conditions.

Examples C7 and C8 were prepared to yield a ceramic with a nominal composition of 88 volume % $ZrW_2O_8$+12 volume % (13.7 weight %) $ZrO_2$. X-ray diffractometry of the fired samples (Table 5) shows that these two phases do, in fact, coexist. The fired bar possessed a very powdery surface after firing, which was found to consist almost entirely of zirconium oxide. Such a surface would be unsuitable for direct attachment of a fiber grating, and would require machining to expose the low-porosity interior of the sample. The CTE of the sample, after removal of the surface layer, was measured to be $-68 \times 10^{-7}$ °$C.^{-1}$, only slightly less negative than the predicted value of $-75 \times 10^{-7}$ °$C.^{-1}$. The dimensional stability of a similar ceramic of $ZrW_2O_8$ with 15 weight % $ZrO_2$ was determined by monitoring the lengths of two sintered bars as a function of time in an 85° C., 85% relative humidity environment. The dimensional changes of these bars is provided in Table 6 (examples D4 and D5) and depicted in FIG. 2.

($ZrSiO_4$)+tungsten oxide, which have CTEs at 25° C. of about $40 \times 10^{-7}$ °$C.^{-1}$ and $160 \times 10^{-7}$ °$C.^{-1}$, respectively. Consequently, the CTE of this ceramic body is highly positive, $64 \times 10^{-7}$ °$C.^{-1}$. The presence of a small amount of cristobalite, a crystalline form of silica, indicates that the reaction did not proceed to completion during the time allowed. Thus, the formation of a $ZrW_2O_8$+fused $SiO_2$ ceramic is not possible, because no such ceramic can be produced due to reaction of silica with the $ZrW_2O_8$.

Examples C11 and C12 were formulated to yield a ceramic having a nominal composition of 91 volume % $ZrW_2O_8$+9 volume % (4.9 weight %) $SiO_2$ in which the $SiO_2$ is added as quartz, a crystalline form of silica. Less volume percent of this form of silica was added than for the case where the $SiO_2$ was added as fused silica because quartz has a much higher thermal expansion than fused silica, so less is required to compensate the CTE of the mixture by Equation 2. As seen in Table 5, the quartz also reacts with $ZrW_2O_8$ to form zircon and tungsten oxide, although in these two examples the lower amount of silica allows for some $ZrW_2O_8$ to remain in the body after firing. However, the CTE of this mixed phase ceramic is only $-61 \times 10^{-7}$ °$C.^{-1}$, less negative than desired, and less negative than predicted from Equation 2 because of the reaction of silica with $ZrW_2O_8$.

Example C13 was formulated to yield a ceramic consisting of 85 weight % (83.6 volume %) $ZrW_2O_8$+15 weight % (16.5 volume %) $ZrSiO_4$, in which the silicate was added as a very fine zircon powder. After firing, the ceramic consisted of $ZrW_2O_8+ZrSiO_4$, with only trace amounts of residual $ZrO_2$ and $WO_3$. The nominal CTE predicted for this composition is $-69 \times 10^{-7}$ °$C.^{-1}$; however, the measured expansion from −40° to +40° C. was $-51 \times 10^{-7}$°$C.^{-1}$. Furthermore, the dilatometric CTE curve exhibited a hysteresis upon heating to +90° C. and cooling back to 20° C., with an increase in sample length corresponding to a ΔL/L of over 400 parts per million. Examination of the sample by scanning electron microscopy showed that the sample had per-

TABLE 6

Change in length expressed as ΔL/L, in parts per million, of ceramic bars exposed to 85° C., 85% relative humidity, for indicated durations.

| Time (hours) | Example D1<br>68% $ZrW_2O_8$<br>32% $Zr_2P_2WO_{12}$<br>0.25% $Y_2O_3$ | Example D2<br>68% $ZrW_2O_8$<br>32% $Zr_2P_2WO_{12}$<br>0.25% $Y_2O_3$ | Time (hours) | Example D3<br>68% $ZrW_2O_8$<br>32% $Zr_2P_2WO_{12}$<br>0.10% $BaCO_3$ | Time (hours) | Example D4<br>85% $ZrW_2O_8$<br>15% $ZrO_2$ | Example D5<br>85% $ZrW_2O_8$<br>15% $ZrO_2$ |
|---|---|---|---|---|---|---|---|
| 0 | 0 | 0 | 0 | 0 | 0 | 0 | 0 |
| 160 | −15 | −5 | 178 | −13 | 162 | −222 | −191 |
| 322 | 0 | 10 | 338 | −15 | 301 | −476 | −458 |
| 482 | −13 | −2 | 498 | −10 | 462 | −1044 | −1123 |
| 642 | −10 | 7 | 658 | −13 | 623 | −2279 | −2800 |
| 802 | −10 | 7 | 800 | −13 | 783 | −4376 | −5441 |

The severe shrinkage of these ceramics over a relatively short span of time renders them inappropriate for use as a fiber grating substrate. For comparison, bars of the inventive compositions 68%$ZrW_2O_8$+32% $Zr_2P_2WO_{12}$+0.25% $Y_2O_3$ (Examples D1 and D2) and the inventive composition 68%$ZrW_2O_8$+32% $Zr_2P_2WO_{12}$+0.10% $BaCO_3$ (Example D3) undergo negligible dimensional change with time under the same conditions of temperature and humidity.

Examples C9 and C10 were prepared to yield a ceramic with a nominal composition of 81 volume % $ZrW_2O_8$+19 volume % (9.2 weight %) $SiO_2$ in which the $SiO_2$ is added as fused silica. Table 5 shows that this combination results in reaction of the $ZrW_2O_8$ with $SiO_2$ to form zircon vasive microcracking throughout the $ZrW_2O_8$ matrix. The dimensional instability of the sample with thermal cycling above room temperature renders this composition inappropriate for application as a fiber grating substrate.

The materials and methods of the present invention can be utilized for a variety of applications requiring negative thermal expansion materials, such as providing temperature compensation for optical devices such as gratings. The materials of the present invention could be used to make support members for such devices.

Figure 3:
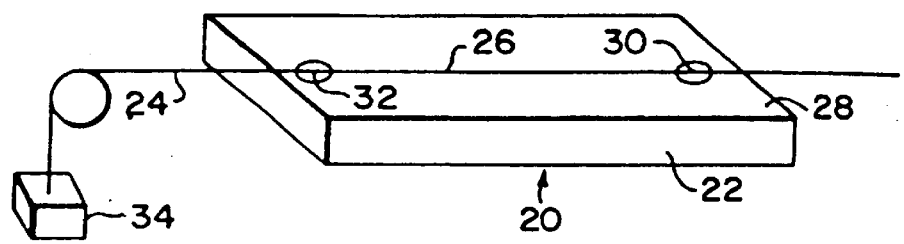
FIG. 3 is a schematic drawing of an embodiment of an athermal optical fiber grating device.

For example, referring to FIG. 3, there is illustrated a first exemplary embodiment of the invention. The optical fiber reflective grating device 20 has a substrate 22 formed from a flat block of a negative expansion material, such as the materials of the present invention. An optical fiber 24 having at least one UV-induced reflective grating 26 written therein is mounted on the surface 28 and attached at either end of the surface at points 30 and 32. It is important that the fiber is straight and not subject to compression as a result of the negative expansion and thus the fiber is usually mounted under tension. Before attachment the fiber is placed under a controlled tension, as shown schematically by the use of a weight 34. The proper choice of tension assures that the fiber is not under compression at all anticipated use temperatures. However, the fiber can be under tension at all anticipated use temperatures. The required degree of tension to compensate for the negative expansion in a particular application can readily be calculated by those with skill in this art.

The attachment material could be an organic polymer, for example an epoxy cement, an inorganic frit, for example ground glass, ceramic or glass-ceramic material, or a metal. In one embodiment the fiber is tacked to the substrate with a UV-cured epoxy adhesive. Mechanical means for attaching the fiber can also be used.

Generally the optical fiber reflective grating is supplied with a coating material surrounding the fiber. In the preferred packaging approach the coating in the grating region of the fiber is left intact while it is removed in the substrate attachment region at each end of the grating. However, the device can have the coating completely removed between the attachment locations. Removal of the coating can be accomplished by one of two methods: a non-contact, non-chemical stripping mechanism or by conventional chemical stripping.

Figure 4:
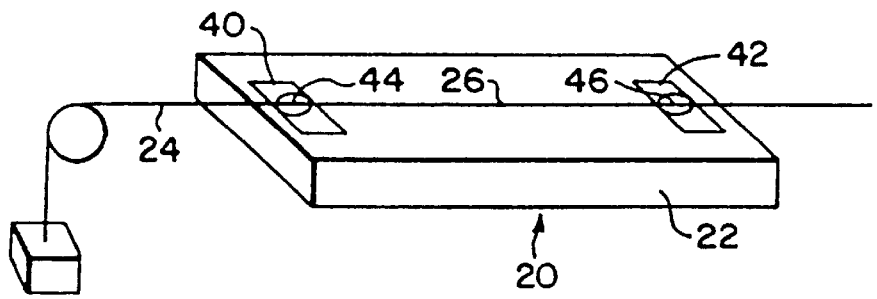
FIG. 4 is a schematic drawing of an embodiment of an athermal optical fiber grating device.

In another embodiment shown in FIG. 4, the fiber is not attached directly to the substrate. Bonding pads 40, 42 made from a material differing from the substrate, for example a glass or a ceramic, are attached to the substrate at either end. The fiber 26 is mounted to the pads at points 44, 46. These pads afford better attachment properties of the pad to the fiber than could be achieved from the substrate directly to the fiber because of the large thermal expansion mismatch. Suitable pad materials have a coefficient of thermal expansion intermediate between that of the fiber and the substrate, for example, between $-50$ and $+5 \times 10^{-7}$, preferably about $-20 \times 10^{-7}$. Alternatively the pad could be a fused silica with a coefficient of expansion closely matching that of the fiber. The pad allows the stress of this joint induced by both the thermal mismatch and the tension of the fiber, to be spread out over a wider area, lessening the chances of cracking and detachment. The attachment materials for the fiber and pad connections are similar to those used for mounting the fiber directly to the substrate, for example, an epoxy cement, an inorganic frit, for example ground glass, ceramic or glass-ceramic material, or a metal.

Figure 5:
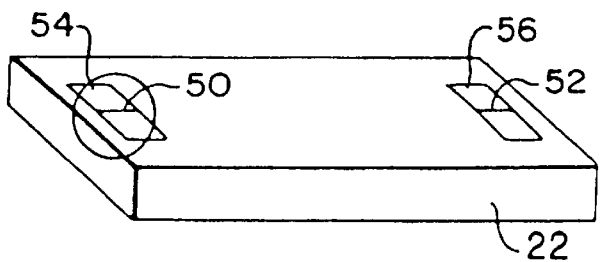
FIG. 5 is a schematic drawing an embodiment of an athermal optical fiber grating device.
Figure 6:
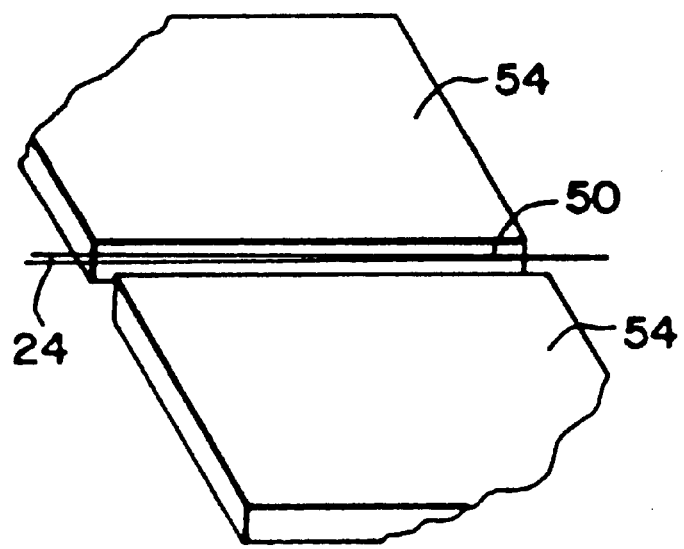
FIG. 6 is an enlarged view of the affixing channel shown in FIG. 5.

In another embodiment shown in FIG. 5, the negative expansion of the substrate material 22 is used to create a clamping force on the fiber. The attachment feature, which might be a hole or channel 50, 52 in a raised portion 54, 56 of the substrate, is formed in the substrate at room temperature with a gap that is very slightly smaller than the fiber. Referring to FIG. 6, by lowering the temperature to a point lower than any anticipated use temperature, the substrate expands and allows the insertion of the fiber 24 into the channel 50. Warming of the substrate then causes substrate contraction and creates a clamping force for holding the fiber in the channel.

Figure 7:
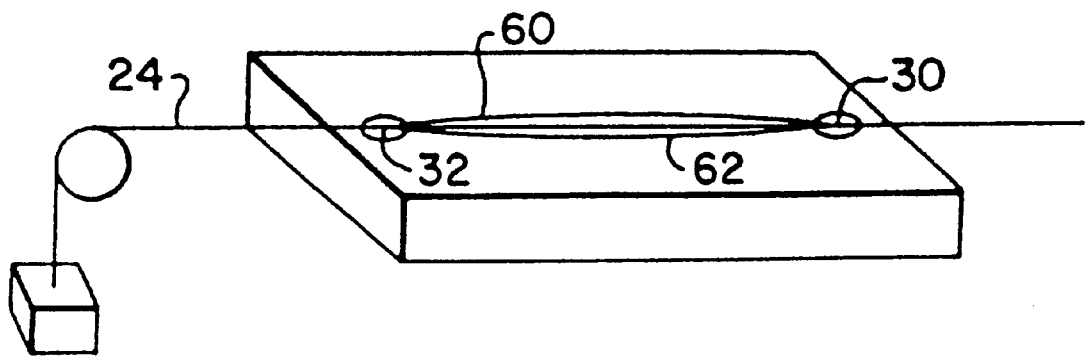
FIG. 7 is a schematic drawing of an embodiment of an athermal fiber grating device.

In another embodiment, FIG. 7, the fiber 24 is attached to the substrate at points 30, 32 and the intermediate fiber length 60 is cushioned by a low modulus damping material 62. This low-modulus material, for example a silicone rubber coating surrounding the fiber or a pad of a silicone rubber, a natural or synthetic rubber or mixtures thereof, between the fiber and the substrate protects the fiber reflective grating against external perturbations such as mechanical shock or vibration. Bowing of the fiber is also minimized. In one embodiment the low modulus material is adhesively attached to the fiber and the substrate.

Mounting the fiber under tension will alter the optical properties of the device (for example, the center wavelength of a grating). This can be addressed by biasing the device with a reflective grating written therein to account for the tension, or it can be done by mounting a fiber, for example a germania doped silica fiber, without a reflective grating written therein under tension and then exposing the fiber to UV light in order to fabricate the grating in the device in situ.

In a typical embodiment of the invention, the temperature sensitivity of the center wavelength is about 0.0125 nm/° C. for the uncompensated grating, the stress sensitivity of the center wavelength is 0.125 nm shift for 9 g of tension, the bare fiber has a diameter of 125 microns, a coated fiber has a diameter of 250 microns. The strength of the fiber is greater than 200 kpsi, and therefore has a very high reliability.

Although this invention has been described for UV photo induced gratings it can also be applied to the packaging of other thermally sensitive devices. For instance, optical fiber couplers and optical waveguides could be athermalized by attachment to a negative expansion substrate.

Figure 8:
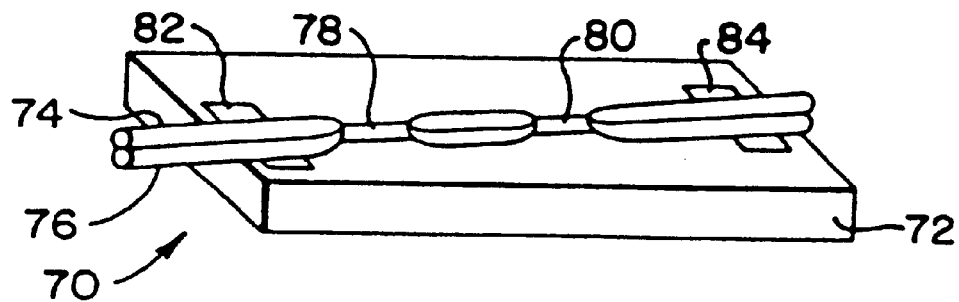
FIG. 8 is a schematic drawing of an embodiment of an athermal optical fiber fused coupler device.

An optical fiber fused coupler has two or more fibers fused together at one or more points along their length and is mounted on a substrate. Such couplers are thermally sensitive which results in a certain amount of thermal instability. Especially sensitive are biconically tapered couplers in which interferometric effects are used, for example a Mach-Zehnder interferometer. Such couplers can be athermalized by mounting the coupler to a negative expansion substrate. FIG. 8 illustrates a fused biconical coupler device 70 which includes a negative expansion substrate 72 to which are mounted two fibers 74, 76. The fibers are fused together at regions 78, 80. The fibers are attached to the substrate near the ends at locations 82, 84 in the same manner as described above for the optical fiber reflective grating.

Figure 9:
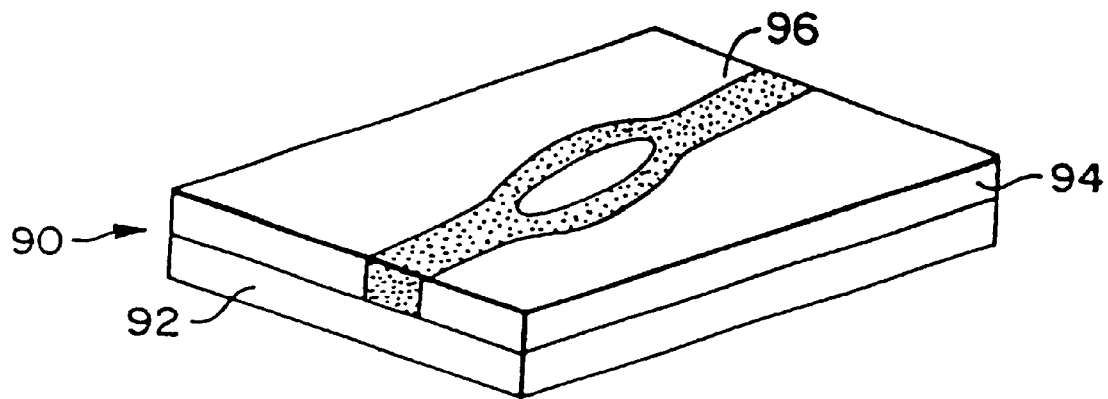
FIG. 9 is a schematic drawing of an embodiment of an athermal planar waveguide device.

Waveguides can be defined, for example, in optical fibers or planar substrates. Such waveguides are thermally sensitive which results in a certain amount of thermal instability. Such waveguides can be athermalized by mounting the waveguide to a negative expansion substrate. FIG. 9 illustrates a planar waveguide device 90 which includes a negative expansion substrate 92 on which is adhesively mounted a layer of material 94 in which a planar waveguide 96 is fabricated by methods well known to those skilled in this art. The waveguide material can be, for example, a doped silica such as a germania silicate, other suitable glass compositions, polymers and semiconductors, including semiconductors with gain, such as laser diodes.

Figure 10:
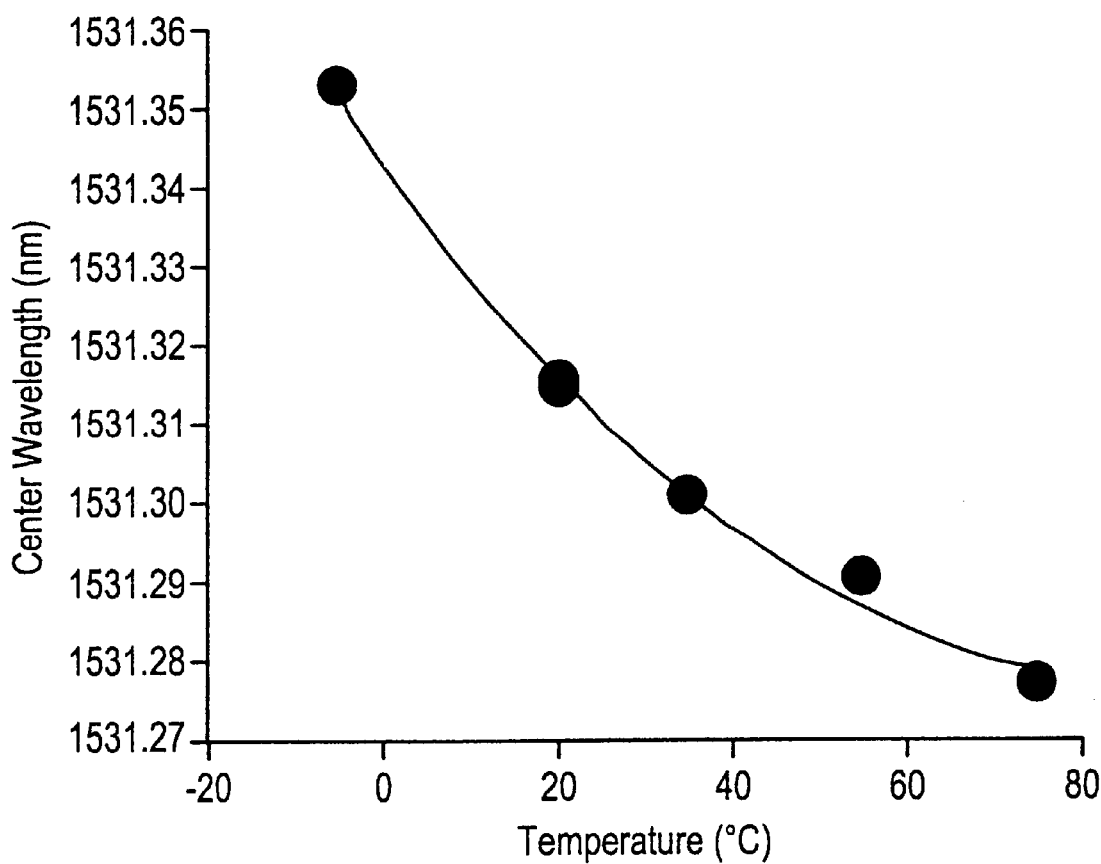
FIG. 10 is a plot of center wavelength (nm)versus temperature (° C.) of an embodiment of an athermal fiber Bragg grating device.

A fiber Bragg grating device with greatly reduced temperature dependence was fabricated by attaching a fiber Bragg grating under tension to a substrate of Example 78 of Tables 2 and 3 using a tin zinc phosphate glass frit containing 45 weight % of a magnesium cobalt pyrophosphate filler. FIG. 10 shows the beneficial athermalization properties of the invention with the center wavelength of this fiber Bragg grating device plotted against temperature of the device. At $-5°$ C. the center wavelength of the grating was 1531.353 nm, and at 75° C. the center wavelength was 1531.277 nm.

Thus, over this range in temperature, the device exhibited a variation in wavelength versus temperature of −0.00095 nm/° C., compared with +0.012 nm/° C. for an unattached grating. In a preferred embodiment, the device includes a negative expansion substrate having a composition comprising two phases having negative coefficients of thermal expansion, one of the phases having a room temperature coefficient of thermal expansion more negative than $-50 \times 10^{-7}$° C.$^{-1}$ and a fiber Bragg grating affixed to the substrate, wherein the absolute value of the average temperature dependence of the Bragg wavelength between 0° C. and 70° C. is not more than about 0.0025 nm/° C. In a further embodiment, the device includes a negative expansion substrate having a composition comprising two phases having negative coefficients of thermal expansion, one of the phases having a room temperature coefficient of thermal expansion more negative than $-50 \times 10^{-7}$° C.$^{-1}$ and a fiber Bragg grating affixed to the substrate, wherein the absolute value of the average temperature dependence of the Bragg wavelength between 0° C. and 70° C. is not more than about 0.001 nm/° C.

It will be understood that while the exemplary device embodiments included flat substrates, this invention is not limited to a particularly shaped substrate. For example, it is contemplated that the ceramic bodies of the present invention could be utilized to make tubular and cylindrical substrates, or substrates that contain a V-shaped, U-shaped, or rectangular trough or groove.

The device of this invention is a completely passive system and mechanically simple, and demonstrates athermalization. The method of producing the device is advantageous because it provides temperature compensated optical devices which tolerate shock and vibration and are thermally stable.

It will be apparent to those skilled in the art that various modifications and variations can be made in the of the present invention without departing from the spirit or scope of the invention. Thus, it is intended that the present invention cover the modifications and variations of this invention provided they come within the scope of the appended claims and their equivalents.

What is claimed is:

1. An optical device comprising:
  a negative expansion substrate having a composition comprising two phases having negative coefficients of thermal expansion, one of the phases having a room temperature coefficient of thermal expansion more negative than $-50 \times 10^{-7}$° C.$^{-1}$; and
  a thermally sensitive, positive expansion optical component affixed to the substrate.

2. The optical device of claim 1, wherein one phase has the composition $M_2B_3O_{12}$ where M is selected from the group including aluminum, scandium, indium, yttrium, the lanthanide metals, zirconium, and hafnium, and where B is selected from the group consisting of tungsten, molybdenum, and phosphorus, and where M and B are selected such that the compound $M_2B_3O_{12}$ has a negative CTE, and wherein the second phase has the composition $AX_2O_8$, where A is selected from the group consisting of zirconium and hafnium, and X is selected from the group consisting of tungsten and molybdenum.

3. The optical device of claim 1, wherein the first material is $AW_2O_8$ and the second material is $A_2P_2WO_{12}$, wherein A is selected from the group consisting of Zr and Hf.

4. The optical device of claim 3, wherein the substrate does not exhibit microcracking.

5. The optical device of claim 3, wherein the substrate further includes a crystalline or non-crystalline oxide phase, including a glassy phase, which contains a metal selected from the group consisting of alkaline earth metals, alkali metals, manganese, iron, cobalt, copper, zinc, aluminum, gallium, bismuth, yttrium, lanthanide metals, scandium, niobium, titanium and nickel.

6. The optical device of claim 4, wherein, on a weight percent basis, the $AW_2O_8$ is present in an amount ranging from about 50% to 95%, $A_2P_2WO_{12}$ is present in amount of about 5% to 50%.

7. The optical device of claim 1, wherein the optical component is an optical fiber grating.

8. The optical device of claim 4, wherein the substrate has a mean linear coefficient of thermal expansion of about $-40 \times 10^{-7}$° C.$^{-1}$ to $-88 \times 10^{-7}$° C.$^{-1}$ over a temperature range of about −40° C. to 85° C.

9. The optical device of claim 3, wherein the device is not hermetically sealed.

10. An optical device comprising:
  a negative expansion substrate having a composition comprising two phases having negative coefficients of thermal expansion, one of the phases having a room temperature coefficient of thermal expansion more negative than $-50 \times 10^{-7}$° C.$^{-1}$; and
  a fiber Bragg grating having a Bragg wavelength affixed to the substrate, wherein the absolute value of the average temperature dependence of the Bragg wavelength between 0° C. and 70° C. is not more than about 0.0025 nm/° C.

11. The optical device of claim 10, wherein one phase has the composition $M_2B_3O_{12}$ where M is selected from the group including aluminum, scandium, indium, yttrium, the lanthanide metals, zirconium, and hafnium, and where B is selected from the group consisting of tungsten, molybdenum, and phosphorus, and where M and B are selected such that the compound $M_2B_3O_{12}$ has a negative CTE, and wherein the second phase has the composition $AX_2O_8$, where A is selected from the group consisting of zirconium and hafnium, and X is selected from the group consisting of tungsten and molybdenum.

12. The optical device of claim 10, wherein the first material is $AW_2O_8$ and the second material is $A_2P_2WO_{12}$, wherein A is selected from the group consisting of Zr and Hf.

13. The optical device of claim 12, wherein the substrate does not exhibit microcracking.

* * * * *